United States Patent
Hamamatsu et al.

(10) Patent No.: US 7,885,968 B1
(45) Date of Patent: Feb. 8, 2011

(54) DATA CONVERSION METHOD PROCESSING FOR CONVERSION OF A FIRST DATABASE AND A PLURALITY OF QUERIES INTO A SECOND DATABASE AND PLURALITY OF QUERIES AND APPARATUS PROGRAM AND STORAGE MEDIA OF THE SAME

(75) Inventors: Tsuyoshi Hamamatsu, Tokyo (JP); Mitsuaki Hirayama, Tokyo (JP)

(73) Assignee: Inforce Co., Ltd., Tokyo (JP)

( * ) Notice: Subject to any disclaimer, the term of this patent is extended or adjusted under 35 U.S.C. 154(b) by 0 days.

(21) Appl. No.: 12/709,714

(22) Filed: Feb. 22, 2010

(30) Foreign Application Priority Data

Sep. 18, 2009 (JP) ............................ 2009-218152
Dec. 28, 2009 (JP) ............................ 2009-298466

(51) Int. Cl.
*G06F 17/30* (2006.01)

(52) U.S. Cl. ..................................................... 707/760

(58) Field of Classification Search ................. 707/760, 707/763

See application file for complete search history.

(56) References Cited

U.S. PATENT DOCUMENTS

| | | | | |
|---|---|---|---|---|
| 5,987,452 | A * | 11/1999 | Kung | 1/1 |
| 6,604,101 | B1 * | 8/2003 | Chan et al. | 707/706 |
| 6,611,838 | B1 * | 8/2003 | Ignat et al. | 1/1 |
| 7,680,828 | B2 * | 3/2010 | Gorelik | 707/763 |
| 7,801,908 | B2 * | 9/2010 | Zachariah | 707/763 |
| 7,818,352 | B2 * | 10/2010 | Krishnamoorthy et al. | 707/803 |
| 7,840,895 | B2 * | 11/2010 | Bhatia et al. | 715/239 |
| 2008/0250000 | A1 * | 10/2008 | Wories et al. | 707/4 |
| 2010/0094838 | A1 * | 4/2010 | Kozak | 707/705 |
| 2010/0114932 | A1 * | 5/2010 | Whitcher et al. | 707/760 |
| 2010/0185645 | A1 * | 7/2010 | Pazdziora | 707/760 |

FOREIGN PATENT DOCUMENTS

JP 2002351710 A 12/2002

OTHER PUBLICATIONS

Honmaki Chiaki Visulabasic for Access User, "Transfer and communication method between databases which are different each other base of the difference of NET introduction develop circumstance," Windows Developer Magazine, Japan, Showei-sha Corp., Oct. 1, 2005, vol. 11, No. 7, pp. 64-75, with partial English translation.
Hoshino, T., "Easy reform by cashing techniques for reform of Access system," dotNETMAGAZINE, Japan, Showei-sha Corp., Feb. 1, 2004, vol. 10, No. 1, pp. 146-154, with partial English translation.

* cited by examiner

*Primary Examiner*—Neveen Abel-Jalil
*Assistant Examiner*—Kevin Young
(74) *Attorney, Agent, or Firm*—Cermak Nakajima LLP; Tomoko Nakajima

(57) ABSTRACT

Converting from a database system to another database system. The conversion process including translating a set of queries for the first database to be used in the second database by determining the query types of the parent and child queries and generating the translated queries according to the type of the query. The type of the query judged as the stored-procedure or the dummy type, irrespective of the existence of a parent query, the function type query after conversion other than the same stored-procedure type query after conversion of the function are generated in all cases. As a result problem is not occurred even when there is a parent.

12 Claims, 62 Drawing Sheets

FIG. 2

| ACTION QURTY | REARRANGEMENT | PARAMETER | FORM REFERENCE | OUTPUT TYPE (CHILD) | | | | | OUTPUT TYPE AFTER CONVERSION |
|---|---|---|---|---|---|---|---|---|---|
| | | | | NO CHILD | HAVING CHILD | | | | |
| | | | | | VIEW | FUNCTION | ST | DUMMY | |
| ○ | - | - | - | - | - | - | - | - | ST |
| × | × | × | - | ○ | - | - | - | - | VIEW |
| × | × | × | - | - | ○ | × | × | × | VIEW |
| × | × | × | - | - | - | ○ | × | × | DUMMY |
| × | × | × | - | - | - | - | ○ | × | DUMMY |
| × | × | × | - | - | - | - | - | ○ | DUMMY |
| × | × | ○ | × | ○ | - | - | - | - | FUNCTION |
| × | × | ○ | × | - | ○ | × | × | × | FUNCTION |
| × | × | ○ | × | - | - | ○ | × | × | DUMMY |
| × | × | ○ | × | - | - | - | ○ | × | DUMMY |
| × | × | ○ | × | - | - | - | - | ○ | DUMMY |
| × | × | ○ | ○ | ○ | - | - | - | - | ST |
| × | × | ○ | ○ | - | ○ | × | × | × | ST |
| × | × | ○ | ○ | - | △ | ○ | × | × | DUMMY |
| × | × | ○ | ○ | - | - | - | ○ | × | DUMMY |
| × | × | ○ | ○ | - | - | - | - | ○ | DUMMY |
| OTHERS | | | | ○ | - | - | - | - | ST |
| | | | | - | ○ | × | × | × | ST |
| | | | | - | - | ○ | × | × | DUMMY |
| | | | | - | - | - | ○ | × | DUMMY |
| | | | | - | - | - | - | ○ | DUMMY |

ST: STORED-PROCEDURE

FIG. 16

<TARGE FOR CONVERSION>

[TABLE]

| TABLE NAME | |
|---|---|
| T_Tbl | |
| ITEM OF TABLE | |

| ITEM NAME | DETA TYPE | DUMMY TYPE |
|---|---|---|
| ID | INTEGER | MAIL KEY |
| VALUE | INTEGER | |

[FORM]

| FORM NAME | REMARKS |
|---|---|
| F_Frm | REFERENCE TO Q_Qry_C2_02 |

FIG. 17

SERIES 0 : SIMPLEEST QUERY REFERRED TO FROM ALL SERIES

| QUERY NAME | REMARKS |
|---|---|
| Q_Qry_01 | QUERY NOT HAVING CHILD |
| SQL CHARACTER STRING ||
| SELECT * FROM T_Tbl ||

FIG. 18

SERIES A: SERIES GENERATED AS VIEW MAINLY

| QUERY NAME | REMARKS |
|---|---|
| Q_Qry_A1_02 | |

| SQL CHARACTER STRING |
|---|
| SELECT * FROM Q_Qry_01 |

| QUERY NAME | REMARKS |
|---|---|
| Q_Qry_A1_03 | |

| SQL CHARACTER STRING |
|---|
| SELECT * FROM Q_Qry_A1_02 |

| QUERY NAME | REMARKS |
|---|---|
| Q_Qry_A2_02 | IMPLICIT PARAMETER |

| SQL CHARACTER STRING |
|---|
| SELECT * FROM Q_Qry_01<br>WHERE Q_Qry_01.[VALUDE] >= [INPUT VALUE] |

| QUERY NAME | REMARKS |
|---|---|
| Q_Qry_A2_03 | HAVING CHILD INCLUDING IMPLICIT PARAMETER |

| SQL CHARACTER STRING |
|---|
| SELECT * FROM Q_Qry_A2_02 |

FIG. 19

SERIES B: SERIES HAVING ORDER BY PHASE

| QUERY NAME | REMARKS |
|---|---|
| Q_Qry_B_02 | INCLUDING ORDER BY |
| SQL CHARACTER STRING | |

SELECT * FROM Q_Qry_01

ORDER BY Q_Qry_01.[VALUE]

| QUERY NAME | REMARKS |
|---|---|
| Q_Qry_B_03 | HAVING CHILD INCLUDING ORDER BY |
| SQL CHARACTER STRING | |

SELECT * FROM Q_Qry_B_02

FIG. 20

SERIES C: SERIES INCLUDING PARAMETER

| QUERY NAME | REMARKS |
|---|---|
| Q_Qry_C1_02 | INCLUDING EXPLICIT PARAMETER. NO REFERENCE FROM FORM |
| SQL CHARACTER STRING | |

PARAMETERS prmVALUE;
    SELECT * FROM Q_Qry_01
    WHERE Q_Qry_01.[VALUE] >= prmVALUDE

| QUERY NAME | REMARKS |
|---|---|
| Q_Qry_C1_03 | HAVING CHILD INCLUDING EXPLICIT PARAMETER |
| SQL CHARACTER STRING | |

SELECT * FROM
    Q_Qry_C1_02

| QUERY NAME | REMARKS |
|---|---|
| Q_Qry_C2_02 | INCLUDING EXPLICIT PARAMETER. REFERENCE FROM F_Frm |
| SQL CHARACTER STRING | |

PARAMETERS prmVALUE;
    SELECT * FROM Q_Qry_01
    WHERE Q_Qry_01.[VALUE] >= prmVALUE

| QUERY NAME | REMARKS |
|---|---|
| Q_Qry_C2_03 | HAVING CHILD INCLUDING EXPLICIT PARAMETER |
| SQL CHARACTER STRING | |

SELECT * FROM Q_Qry_C2_02

FIG. 21
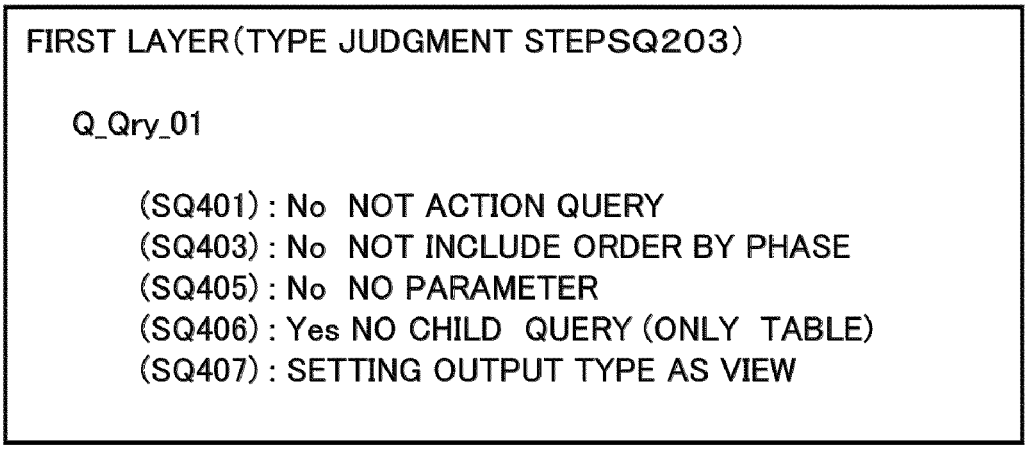
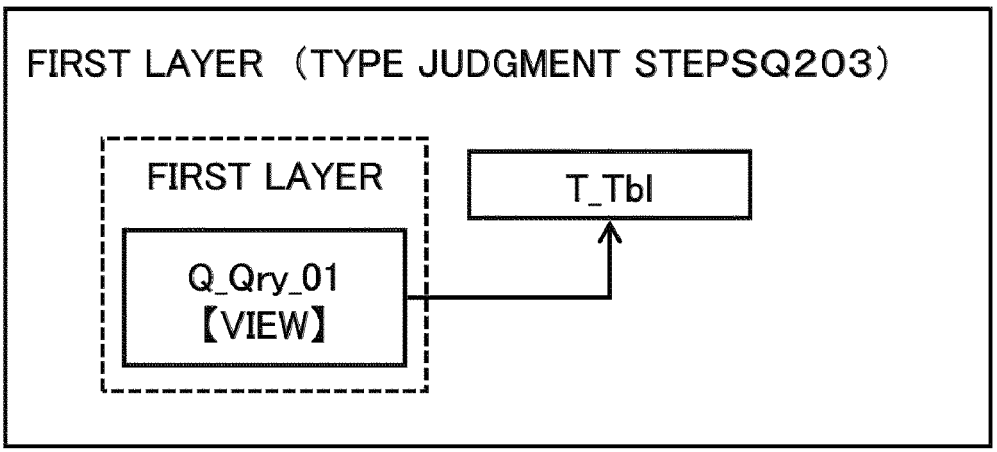

FIG. 22

```
SECOND LAYER (TYPE JUDGMENT STEPSQ203)

Q_Qry_A1_02

(SQ401) : No  NOT ACTION QUERY
      (SQ403) : No  NOT INCLUDE ORDER BY PHASE
      (SQ405) : No  NO PARAMETER
      (SQ406) : Yes HAVING ONLY VIEW CHILD
      (SQ407) : SETTING OUTPUT TYPE AS VIEW

Q_Qry_A2_02

(SQ401) : No  NOT ACTION QUERY
      (SQ403) : No  NOT INCLUDE ORDER BY PHASE
      (SQ405) : No  NO PARAMETER
      (SQ406) : Yes HAVING ONLY VIEW CHILD
      (SQ407) : SETTING OUTPUT TYPE AS VIEW
            ※IMPLICIT PARAMETER CAN NOT BE JUDGED  AT OTHIS
POINT. THEREFORE  IT IS JUDGED AS NO PARAMETER IN  SQ405

Q_Qry_B_02

(SQ401) : No  NOT ACTION QUERY
      (SQ403) : No  INCLUDING ORDER BY PHASE
      (SQ404) SETTING OUTPUT TYPE AS DUMMY TYPE

Q_Qry_C1_02

(SQ401) : No  NOT ACTION QUERY
      (SQ403) : No  NOT INCLUDE ORDER BY PHASE
      (SQ405) : No  HAVING PARAMETER
      (SQ409) : No  NOT REFERENCE FROM FORM
      (SQ410) : Yes HAVING ONLY VIEW CHILD
      (SQ411) : SETTING OUTPUT TYPE AS FUNCTION

Q_Qry_C2_02
      (SQ401) : No  NOT ACTION QUERY
      (SQ403) : No  NOT INCLUDE ORDER BY PHASE
      (SQ405) : No  HAVING PARAMETER
      (SQ409) : Yes REFERENCE FROM FORM
      (SQ415) : Yes HAVING ONLY VIEW CHILD
      (SQ402) : OUTPUT TYPE IS SET AS STORED-PROCEDURE
```

FIG. 24

```
THIRD LAYER (TYPE JUDGMENT STEPSQ203)

Q_Qry_A1_03

(SQ401) : No  NOT ACTION QUERY
    (SQ403) : No  NOT INCLUDE ORDER BY PHASE
    (SQ405) : No  NO PARAMETER
    (SQ406) : Yes HAVING ONLY VIEW CHILD
    (SQ407) : SETTING OUTPUT TYPE AS VIEW

Q_Qry_A2_03

(SQ401) : No  NOT ACTION QUERY
    (SQ403) : No  NOT INCLUDE ORDER BY PHASE
    (SQ405) : No  NO PARAMETER
    (SQ406) : Yes HAVING ONLY VIEW CHILD
    (SQ407) : SETTING OUTPUT TYPE AS VIEW

Q_Qry_B_03

(SQ401) : No  NOT ACTION QUERY
    (SQ403) : No  NOT INCLUDE ORDER BY PHASE
    (SQ405) : No  NO PARAMETER
    (SQ406) : No  CHILD IS DUMMY TYPE
    (SQ407) SETTING OUTPUT TYPE AS DUMMY TYPE

Q_Qry_C1_03

(SQ401) : No  NOT ACTION QUERY
    (SQ403) : No  NOT INCLUDE ORDER BY PHASE
    (SQ405) : No  NO PARAMETER
    (SQ406) : No  CHILD IS FUNCTION
    (SQ407) SETTING OUTPUT TYPE AS DUMMY TYPE

Q_Qry_C2_0

(SQ401) : No  NOT ACTION QUERY
    (SQ403) : No  NOT INCLUDE ORDER BY PHASE
    (SQ405) : No  NO PARAMETER
    (SQ406) : No  CHILD IS STORED-PROCEDURE
    (SQ407) SETTING OUTPUT TYPE AS DUMMY TYPE
```

```
FIRST HALF OF TYPE CORRECTION STEP
(SQ501) -> (SQ503)/(SQ502) -> (SQ504)
IT PROCESSES SEQUENTIALLY FROM LOWER CLASS
```

```
FIRST LAYER (FIRST HAFL OF TYPE CORRECTION STEPSQ204)

Q_Qry_01

(SQ501) : No  NO IMPLICIT PARAMETER
       (SQ503) : HOLD ORIGINAL TYPE
```

FIRST LAYER (FIRST HALF OF TYPE CORRECTION STEPSQ204)

FIG. 27

```
SECOND LAYER (FIRST HALF OF TYPE CORRECTION STEPSQ204)

Q_Qry_A1_02
   Q_Qry_B_02
   Q_Qry_C1_02
   Q_Qry_C2_02
       (SQ501) : No  NO IMPLICIT PARAMETER
       (SQ503) : HOLD ORIGINAL TYPE

Q_Qry_A2_02
       (SQ501) : Yes  IMPLICIT PARAMETER
       (SQ502) : CORRECT OUTPUT TYPE TO DUMMY TYPE
```

FIG. 29

THIRD LAYER (FIRT HALF OF TYPE CORRECTION STEPSQ204)

Q_Qry_A1_03
Q_Qry_A2_03
Q_Qry_B_03
Q_Qry_C1_03
Q_Qry_C2_03
    (SQ501) : No  NO IMPLICIT PARAMETER
    (SQ503) : HOLD ORIGINAL TYPE

```
SECOND HAFL OF TYPE CORRECTION STEPSQ204
(SQ505) -> (SQ506)/(SQ507) -> (SQ508)
IT PROCESSES SEQUENTIALLY FROM LOWER CLASS
```

```
FIRST LAYER (SECOND HAFL OF TYPE CORRECTION STEPSQ204)

Q_Qry_0
      (SQ505) : No CHILD QUERY (ONLY TABLE)
      (SQ508) : HOLD ORIGINAL TYPE
```

FIRST LAYER (SECOND HAFL OF TYPE CORRECTION STEPSQ204)

FIG. 32

```
SECOND LAYER (SECOND HAFL OF TYPE CORRECTION STEPSQ204)

Q_Qry_A1_02
   Q_Qry_A2_02
   Q_Qry_B_02
   Q_Qry_C1_02
   Q_Qry_C2_02
       (SQ505) : No  NO  CHILID QUERY HAVING PARAMETER (ONLY  VIEW)
       (SQ508) : HOLD ORIGINAL TYPE
```

FIG. 34

```
THIRD LAYER (SECOND HAFL OF TYPE CORRECTION STEPSQ204)

Q_Qry_A1_03
       (SQ505) : No  NO CHILD QUERY HAVING PARAMETER (ONLY VIEW)
       (SQ508) : HOLD ORIGINAL TYPE

Q_Qry_A2_03
       (SQ505) : Yes CHILD QUERY HAVING PARAMETER (DUMMY TYEP)
       (SQ507) : CORRECT OUTPUT TYPE TO DUMMY TYPE

Q_Qry_B_03
   Q_Qry_C1_03
   Q_Qry_C2_03
       (SQ505) : Yes CHILD QUERY HACING PARAMETER (DUMMY TYPE /
FUCTION/ STORED-PROCEDURE)
       (SQ507) : CORRECT OUTPUT TYPE TO DUMMY TYPE..HOWEVER ALREDY
DUMMY TYPE IN THIS CASE.
```

CALL METHOD DETERMINATION STEPSQ205を、
IT PROCESSES SEQUENTIALLY FROM LOWER CLASS

FIRST LAYER (CALL METHOD DETERMINATION STEPSQ205)

Q_Qry_01
      (SQ901) : No  NOT ACTION QUERY
      (SQ903) : Yes  VIEW
      (SQ904) : CALL BY ORIGINAL QUERY NAME
            Q_Qry_01

FIRST LAYER (CALL METHOD DETERMINATION STEPSQ205)

FIG. 37

```
SECOND LAYER (CALL METHOD DETERMINATION STEPSQ205)

Q_Qry_A1_02
     (SQ901) : No  NOT ACTION QUERY
     (SQ903) : Yes VIEW
     (SQ904) : CALL BY ORIGINAL QUERY NAME
               Q_Qry_A1_02

Q_Qry_A2_02
     (SQ901) : No  NOT ACTION QUERY
     (SQ903) : No  NOT VIEW
     (SQ905) : No  NOT FUNCTION
     (SQ907) : Yes HAVING PARAMETER
     (SQ908)   CALL BY OTHER FUNCTION NAME(PARAMETER)
               NEST_Q_Qry_A2_02( @prm VALUE INPUT )

Q_Qry_B_02
     (SQ901) : No  NOT ACTION QUERY
     (SQ903) : No  NOT VIEW
     (SQ905) : No  NOT FUNCTION
     (SQ907) : No  NO PARAMETER
     (SQ909) : CALL BY OTHER FUNCTION NAME(PARAMETER)
               NEST_Q_Qry_B_02()

Q_Qry_C1_02
     (SQ901) : No  NOT ACTION QUERY
     (SQ903) : No  NO T VIEW
     (SQ905) : Yes FUNCTION
     (SQ906) : CALL BY ORICGINAL QUERY NAME(PARAMETER)
               Q_Qry_C1_02( @prm VALUE )

Q_Qry_C2_02
     (SQ901) : No  NOT ACTION QUERY
     (SQ903) : No  NO VIEW
     (SQ905) : No  NO FUNCTION
     (SQ907) : Yes HAVING PARAMETER
     (SQ908) CALL BY OTHER FUNCTION NAME(PARAMETER)
             NEST_Q_Qry_C2_02( @prm VALUE )
```

FIG. 39

```
THIRD LAYER    (CALL METHOD DETERMINATION STEPSQ205)

Q_Qry_A1_03
  (SQ901) : No  NOT ACTION QUERY
  (SQ903) : Yes VIEW
  (SQ904) : CALL BY ORIGINAL QUERY NAME
          Q_Qry_A1_03

Q_Qry_B_03
  (SQ901) : No  NOT ACTION QUERY
  (SQ903) : No  NOT VIEW
  (SQ905) : No  NOT FUNCTION
  (SQ907) : No  NO PARAMETER
  (SQ909) : CALL BY OTHER FUNCTION NAME
      NEST_Q_Qry_B_03()

Q_Qry_A2_03
Q_Qry_C1_03
Q_Qry_C2_03
  (SQ901) : No  NOT ACTION QUERY
  (SQ903) : No  NOT VIEW
  (SQ905) : No  NOT FUNCTION
  (SQ907) : Yes HAVING PARAMETER
  (SQ908) CALL BY OTHER FUNCTION NAME(PARAMETER)
    NEST_Q_Qry_A2_03( @prmA )
    NEST_Q_Qry_C1_03( @prmC )
    NEST_Q_Qry_C2_03( @prmC )
```

FIG. 41

SQL SENTENCE GENERATION STEPSQ206

```
FIRST LAYER  (SQL SENTENCE GENERATION STEPSQ206)

Q_Qry_01
      (SQ1001) : SQLSYNTAX CONVERSION
      (SQ1002) : No  NOT HAVING CHILD  QUERY (ONLY TABLE)
      (END)
```

FIRST LAYER (SQL SENTENCE GENERATION STEPSQ206)

| QUERY NAME | |
|---|---|
| Q_Qry_01 | |
| SQL CHARACTER STRING BEFORE PROCESSING | |
| SELECT * FROM T_Tbl | |
| SQL CHARACTER STRING AFTER PROCESSING | |
| SELECT * FROM T_Tbl | |

FIG. 42

```
SECOND LAYER (SQL SENTENCE GENERATION STEPSQ206)

Q_Qry_A1_02
   Q_Qry_A2_02
   Q_Qry_B_02
   Q_Qry_C1_02
   Q_Qry_C2_02
         (SQ1001) : SQLSYNTAX CONVERSION
         (SQ1002) : Yes HAVING CHILD QUERY
         (SQ1003) : PERFORM QUERY REPLACEMENT PROCESSING
                   TO EACH CHILD QUERY
            Q_Qry_01
               (SQ1004) : Yes CHILD QUERY IS VIEW
               (SQ1005) : Yes  END OF PROCESSING FOR ALL CHILD QUERY
         (END)
```

FIG. 43

SECOND LAYER (SQL SENTENCE GENERATION STEPSQ206)

| QUERY NAME |
|---|
| Q_Qry_A1_02 |

| SQL CHARACTER STRING BEFORE PROCESSING |
|---|
| SELECT * FROM Q_Qry_01 |

| SQL CHARACTER STRING AFTER PROCESSING |
|---|
| SELECT * FROM Q_Qry_01 |

| QUERY NAME |
|---|
| Q_Qry_A2_02 |

| SQL CHARACTER STRING BEFORE PROCESSING |
|---|
| SELECT * FROM Q_Qry_01<br>WHERE Q_Qry_01.[VALUE] >= [INPUT VALUE] |

| SQL CHARACTER STRING AFTER PROCESSING |
|---|
| SELECT * FROM Q_Qry_01<br>WHERE Q_Qry_01.[VALUE] >= @prm INPUT VALUE |

FIG. 44

```
SECOND LAYER    (SQL SENTENCE GENERATION STEP S Q 2 0 6)

QUERY NAME
  Q_Qry_B_02
  SQL CHARACTER STRING BEFORE PROCESSING
        SELECT * FROM Q_Qry_01
        ORDER BY
        Q_Qry_01.[VALUE]

SQL CHARACTER STRING AFTER PROCESSING
        SELECT TOP 100 PERCENT * FROM Q_Qry_01
        ORDER BY _Qry_01.[VALUE]

QUERY NAME
  Q_Qry_C1_02
  SQL CHARACTER STRING BEFORE PROCESSING

PARAMETERS prmVALUE;
        SELECT * FROM Q_Qry_01
        WHERE Q_Qry_01.[VALUE] >= prmVALUE

SQL CHARACTER STRING AFTER PROCESSING

SELECT * FROM Q_Qry_01
        WHERE Q_Qry_01.[VALUE] >= @prm VALUE
```

FIG. 45

```
SECOND LAYER    (SQL SENTENCE GENERATION STEP S Q 2 0 6)
```

| QUERY NAME |
|---|
| Q_Qry_C2_02 |
| SQL CHARACTER STRING BEFORE PROCESSING |
| PARAMETERS prmVALUE;<br>SELECT * FROM Q_Qry_01<br>WHERE Q_Qry_01.[VALUE] >= prmVALUE |
| SQL CHARACTER STRING AFTER PROCESSING |
| SELECT * FROM Q_Qry_01<br>WHERE Q_Qry_01.[VALUE] >= @prm VALUE |

FIG. 46

```
THIRD LAYER (SQL SENTENCE GENERATION STEPSQ206)

Q_Qry_A1_03
      (SQ1001) : SQLSYNTAX CONVERSION
      (SQ1002) : Yes HAVING CHILD QUERY
      (SQ1003) : PERFORM QUERY REPLACEMENT PROCESSING
TO EACH CHILD QUERY
         Q_Qry_A1_02
            (SQ1004) : Yes CHILD QUERY IS VIEW
            (SQ1005) : Yes END OF PROCESSING FOR EACH
CHILD QUERY
   (END)
```

THIRD LAYER   (SQL SENTENCE GENERATION STEPSQ206)

| QUERY NAME | |
|---|---|
| Q_Qry_A1_03 | |
| SQL CHARACTER STRING BEFORE PROCESSING | |
| SELECT * FROM Q_Qry_A1_02 | |
| SQL CHARACTER STRING AFTER PROCESSING | |
| SELECT * FROM Q_Qry_A1_02 | |

FIG. 47

```
THIRD LAYER  (SQL SENTENCE GENERATION STEPSQ206)

Q_Qry_A2_03
       (SQ1001) : SQLSYNTAX CONVERSION
       (SQ1002) : Yes HAVING CHILD QUERY
       (SQ1003) : PERFORM QUERY REPLACEMENT PROCESSING
TO EACH CHILD QUERY
           Q_Qry_A2_02
               (SQ1004) : No  CHILD QUERY IDUMMYER TYPE
               (SQ1006) : REPLACE  QUERY NAME IN SQL
               (SQ1005) : Yes END OF PROCESSING FOR EACH
CHILD QUERY
      (END)
```

THIRD LAYER   (SQL SENTENCE GENERATION STEPSQ206)

| QUERY NAME | |
|---|---|
| Q_Qry_A2_03 | |
| SQL CHARACTER STRING BEFORE PROCESSING | |
| SELECT * FROM Q_Qry_A2_02 | |
| SQL CHARACTER STRING AFTER PROCESSING | |
| SELECT * FROM NEST_Q_Qry_A2_02( @prm VALUE INPUT) | |

FIG. 48

```
THIRD LAYER  (SQL SENTENCE GENERATION STEPSQ206)

Q_Qry_B_03
    (SQ1001) : SQLSYNTAX CONVERSION
    (SQ1002) : Yes HAVING CHILD QUERY
    (SQ1003) : PERFORM QUERY REPLACEMENT PROCESSING
TO EACH CHILD QUERY
       Q_Qry_B_02
         (SQ1004) : No  CHILD QUERY IS DUMMY TYPE
         (SQ1006) : REPLACEMENT QUERY NAME IN SQL
         (SQ1005) : Yes END OF PROCESSING FOR EACH
CHILD QUERY
    (END)
```

THIRD LAYER  (SQL SENTENCE GENERATION STEPSQ206)

| QUERY NAME | |
|---|---|
| Q_Qry_B_03 | |
| SQL CHARACTER STRING BEFORE PROCESSING | |
| SELECT * FROM Q_Qry_B_02 | |
| SQL CHARACTER STRING AFTER PROCESSING | |
| SELECT * FROM NEST_Q_Qry_B_02() | |

FIG. 49

```
THIRD LAYER  (SQL SENTENCE GENERATION STEPSQ206)

Q_Qry_C1_03
      (SQ1001) : SQLSYNTAX CONVERSION
      (SQ1002) : Yes HAVING CHILD QUERY
      (SQ1003) : PERFORM QUERY REPLACEMENT PROCESSING
TO EACH CHILD QUERY
         Q_Qry_C1_02
            (SQ1004) : No  CHILD QUERY IS FUNCTION
            (SQ1006) : REPLACEMENT QUERY NAME IN SQL
            (SQ1005) : Yes END OF PROCESSING FOR EACH
CHILD QUERY
   (END)
```

THIRD LAYER  (SQL SENTENCE GENERATION STEPSQ206)

| QUERY NAME | |
|---|---|
| Q_Qry_C1_03 | |
| SQL CHARACTER STRING BEFORE PROCESSING | |
| SELECT * FROM Q_Qry_C1_02 | |
| SQL CHARACTER STRING AFTER PROCESSING | |
| SELECT * FROM Q_Qry_C1_02( @prm VALUE) | |

FIG. 50

```
THIRD LAYER (SQL SENTENCE GENERATION STEPSQ206)

Q_Qry_C2_03
     (SQ1001) : SQLSYNTAX CONVERSION
     (SQ1002) : Yes HAVING CHILD QUERY
     (SQ1003) : PERFORM QUERY REPLACEMENT PROCESSING
TO EACH CHILD QUERY
        Q_Qry_C2_02
           (SQ1004) : No  CHILD QUERY IS STORED-
PROCEDURE
           (SQ1006) : REPLACEMENT QUERY NAME IN SQL
           (SQ1005) : Yes END OF PROCESSING FOR EACH
CHILD QUERY
     (END)
```

THIRD LAYER (SQL SENTENCE GENERATION STEPSQ206)

| QUERY NAME |
|---|
| Q_Qry_C1_03 |
| SQL CHARACTER STRING BEFORE PROCESSING |
| SELECT * FROM Q_Qry_C2_02 |
| SQL CHARACTER STRING AFTER PROCESSING |
| SELECT * FROM NEST_Q_Qry_C2_02( @prm VALUE ) |

FIG. 51

FIRST LAYER (QUERY GENERATION STEP SQ207)

Q_Qry_01

| QUERY NAME | OUTPUT TYPE | PARAMETER |
|---|---|---|
| Q_Qry_01 | VIEW | NO |

(SQ1101) : No  NOT ACTION QUERY
(SQ1103) : Yes OUTPUT TYPE IS VIEW
(SQ1104) : GENERATE VIEW BY ORIGINAL QUERY NAME

QUERY GENERATION
COMMAND

```
CREATE VIEW [Q_Qry_01]
AS
    SELECT * FROM
    T_Tbl
```

SECOND LAYER (QUERY GENERATION STEP SQ207)

Q_Qry_A1_02

| QUERY NAME | OUTPUT TYPE | PARAMETER |
|---|---|---|
| Q_Qry_A1_02 | VIEW | NO |

(SQ1101) : No  NOT ACTION QUERY
(SQ1103) : Yes OUTPUT TYPE IS VIEW
(SQ1104) : GENERATE VIEW BY ORIGINAL QUERY NAME

QUERY GENERATION
COMMAND

```
CREATE VIEW [Q_Qry_A1_02]
AS
     SELECT * FROM
     Q_Qry_01
```

FIG. 53

| SECOND LAYER (QUERY GENERATION STEP SQ207) |||
|---|---|---|
| Q_Qry_A2_02 |||
| QUERY NAME | OUTPUT TYPE | PARAMETER |
| Q_Qry_A2_02 | DUMMY TYPE | @prm VALUEを手入力 |

(SQ1101): No  NOT ACTION QUERY
(SQ1103): No  NOT VIEW
(SQ1005): No  NOT FUNCTION
(SQ1107): GENERATION OF STORED-PROCEDURE BY ORIGINAL QUERY NAME
(SQ1108): GENERATION OF FUNCTION BY OTHER FUNCTION NAME

QUERY GENERATION COMMAND

CREATE PROCEDURE [Q_Qry_A2_02]
        ( INPUT @prm VALUE INT )
    AS
    BEGIN
        SELECT * FROM
        Q_Qry_01
        WHERE Q_Qry_01.[VALUE] >= INPUT @prm VALUE
    END

QUERY GENERATION COMMAND

CREATE FUNCTION [NEST_Q_Qry_A2_02]
        ( INPUT @prm VALUE INT )
    RETURNS TABLE
    AS
        SELECT * FROM Q_Qry_01
        WHERE Q_Qry_01.[VALUE] >= INPUT @prm VALUE

FIG. 54

| | | |
|---|---|---|
| SECOND LAYER (QUERY GENERATION STEP SQ207) | | |
| Q_Qry_B_02 | | |

| QUERY NAME | OUTPUT TYPE | PARAMETER |
|---|---|---|
| Q_Qry_B_02 | DUMMY TYPE | NO |

(SQ1101) : No  NOT ACTION QUERY
(SQ1103) : No  NOT VIEW
(SQ1005) : No  NOT FUNCTION
(SQ1107) : GENERATION OF STORED-PROCEDURE BY ORIGINAL QUERY NAME
(SQ1108) : GENERATION OF FUNCTION BY OTHER FUNCTION NAME

QUERY GENERATION
COMMAND

CREATE PROCEDURE [Q_Qry_B_02] (
    )
    AS
    BEGIN
        SELECT TOP 100 PERCENT * FROM Q_Qry_01
        ORDER BY Q_Qry_01. [VALUE]
    END

QUERY GENERATION
COMMAND

CREATE FUNCTION [NEST_Q_Qry_B_02] (
    )
    RETURNS TABLE
    AS
        SELECT TOP 100 PERCENT * FROM Q_Qry_01
        ORDER BY Q_Qry_01. [VALUE]

FIG. 55

SECOND LAYER (QUERY GENERATION STEP SQ207)

Q_Qry_C1_02

| QUERY NAME | OUTPUT TYPE | PARAMETER |
|---|---|---|
| Q_Qry_C1_02 | FUNCTION | @prm VALUE |

(SQ1101) : No  NOT ACTION QUERY
(SQ1103) : No  NOT VIEW
(SQ1005) : Yes  FUNCTION
(SQ1106) : GENERATION OF FUNCTION BY ORIGINAL QUERY NAME

QUERY GENERATION
COMMAND

```
CREATE FUNCTION [Q_Qry_C1_02] (
    @prm VALUE  INT
)
RETURNS TABLE
AS
    SELECT * FROM Q_Qry_01
    WHERE Q_Qry_01.[VALUE] >= @prm VALUE
```

FIG. 56

SECOND LAYER (QUERY GENERATION STEP SQ207)

Q_Qry_C2_02

| QUERY NAME | OUTPUT TYPE | PARAMETER |
|---|---|---|
| Q_Qry_C2_02 | STORED-PROCEDURE | @prm VALUE |

(SQ1101) : No  NOT ACTION QUERY
(SQ1103) : No  NOT VIEW
(SQ1005) : No  NOT FUNCTION
(SQ1107) : GENERATION OF STORED-PROCEDURE BY ORIGINAL QUERY NAME
(SQ1108) : GENERATION OF FUNCTION BY OTHER FUNCTION NAME

QUERY GENERATION
COMMAND

```
CREATE PROCEDURE [Q_Qry_C2_02] (
    @prm VALUE  INT
)
AS
BEGIN
    SELECT * FROM Q_Qry_01
    WHERE Q_Qry_01.[VALUE] >= @prm VALUE
END
```

QUERY GENERATION
COMMAND

```
CREATE FUNCTION [NEST_Q_Qry_C2_02] (
    @prm VALUE  INT
)
RETURNS TABLE
AS
    SELECT * FROM Q_Qry_01
    WHERE Q_Qry_01.[VALUE] >= @prm VALUE
```

FIG. 57

THIRD LAYER (QUERY GENERATION STEP SQ207)

Q_Qry_A1_03

| QUERY NAME | OUTPUT TYPE | PARAMETER |
|---|---|---|
| Q_Qry_A1_03 | VIEW | NO |

(SQ1101) : No  NOT ACTION QUERY
(SQ1103) : Yes OUTPUT TYPE IS VIEW
(SQ1104) : GENERATE VIEW BY ORIGINAL QUERY NAME

| QUERY GENERATION COMMAND |
|---|
| CREATE VIEW [Q_Qry_A1_03] <br> AS <br>     SELECT * FROM Q_Qry_A1_02 |

FIG. 58

THIRD LAYER (QUERY GENERATION STEP SQ207)

Q_Qry_A2_03

| QUERY NAME | OUTPUT TYPE | PARAMETER |
|---|---|---|
| Q_Qry_A2_03 | DUMMY TYPE | INPUT @prm VALUE |

(SQ1101) : No  NOT ACTION QUERY
(SQ1103) : No  NOT VIEW
(SQ1005) : No  NOT FUNCTION
(SQ1107) : GENERATION OF STORED-PROCEDURE BY ORIGINAL QUERY NAME
(SQ1108) : GENERATION OF FUNCTION BY OTHER FUNCTION NAME

QUERY GENERATION COMMAND

```
CREATE PROCEDURE [Q_Qry_A2_03] (
      INPUT @prm VALUE INT
)
AS
BEGIN
      SELECT * FROM NEST_Q_Qry_A2_02( INPUT @prm VALUE)
END
```

QUERY GENERATION COMMAND

```
CREATE FUNCTION [NEST_Q_Qry_A2_03] (
      INPUT @prm VALUE INT
)
RETURNS TABLE
AS
      SELECT * FROM NEST_Q_Qry_A2_02( INPUT @prm VALUE)
```

FIG. 59

> THIRD LAYER (QUERY GENERATION STEP SQ207)
>
> Q_Qry_B_03
>
> | QUERY NAME | OUTPUT TYPE | PARAMETER |
> |---|---|---|
> | Q_Qry_B_03 | DUMMY TYPE | NO |
>
> (SQ1101) : No  NOT ACTION QUERY
> (SQ1103) : No  NOT VIEW
> (SQ1005) : No  NOT FUNCTION
> (SQ1107) : GENERATION OF STORED-PROCEDURE BY ORIGINAL QUERY NAME
> (SQ1108) : GENERATION OF FUNCTION BY OTHER FUNCTION NAME
>
> QUERY GENERATION COMMAND
>
>> CREATE PROCEDURE [Q_Qry_B_03] (
>> )
>> AS
>> BEGIN
>>   SELECT * FROM NEST_Q_Qry_B_02()
>> END
>
> QUERY GENERATION COMMAND
>
>> CREATE FUNCTION [NEST_Q_Qry_B_03] (
>> )
>> RETURNS TABLE
>> AS
>>   SELECT * FROM NEST_Q_Qry_B_02()

FIG. 60

THIRD LAYER (QUERY GENERATION STEP SQ207)

Q_Qry_C1_03

| QUERY NAME | OUTPUT TYPE | PARAMETER |
|---|---|---|
| Q_Qry_C1_03 | DUMMY TYPE | @prm VALUE |

(SQ1101) : No NOT ACTION QUERY
(SQ1103) : No NOT VIEW
(SQ1005) : No NOT FUNCTION
(SQ1107) : GENERATION OF STORED-PROCEDURE BY ORIGINAL QUERY NAME
(SQ1108) : GENERATION OF FUNCTION BY OTHER FUNCTION NAME

QUERY GENERATION COMMAND

```
CREATE PROCEDURE [Q_Qry_C1_03] (
    @prm VALUE  INT
)
AS
BEGIN
    SELECT * FROM Q_Qry_C1_02( @prm VALUE )
END
```

QUERY GENERATION COMMAND

```
CREATE FUNCTION [NEST_Q_Qry_C1_03] (
    @prm VALUE  INT
)
RETURNS TABLE
AS
    SELECT * FROM Q_Qry_C1_02( @prm VALUE )
```

FIG. 61

THIRD LAYER (QUERY GENERATION STEP SQ207)

Q_Qry_C2_03

| QUERY NAME | OUTPUT TYPE | PARAMETER |
|---|---|---|
| Q_Qry_C1_03 | DUMMY TYPE | @prm VALUE |

(SQ1101): No  NOT ACTION QUERY
(SQ1103): No  NOT VIEW
(SQ1005): No  NOT FUNCTION
(SQ1107): GENERATION OF STORED-PROCEDURE BY ORIGINAL QUERY NAME
(SQ1108): GENERATION OF FUNCTION BY OTHER FUNCTION NAME

QUERY GENERATION COMMAND

```
CREATE PROCEDURE [Q_Qry_C2_03] (
    @prm VALUE  INT
)
AS
BEGIN
    SELECT * FROM NEST_Q_Qry_C2_02( @prm VALUE )
END
```

QUERY GENERATION COMMAND

```
CREATE FUNCTION [NEST_Q_Qry_C2_03] (
    @prm VALUE  INT
)
RETURNS TABLE
AS
    SELECT * FROM NEST_Q_Qry_C2_02( @prm VALUE )
```

DATA CONVERSION METHOD PROCESSING FOR CONVERSION OF A FIRST DATABASE AND A PLURALITY OF QUERIES INTO A SECOND DATABASE AND PLURALITY OF QUERIES AND APPARATUS PROGRAM AND STORAGE MEDIA OF THE SAME

This application claims the priority benefit under 35 U.S.C. §119 of Japanese Patent Application No. 2009-218152 filed on Sep. 18, 2009 and Japanese Patent Application No. 2009-298466 filed on Dec. 28, 2009, which are hereby incorporated in its entirety by reference.

FIELD OF INVENTION

The present invention is related to a data conversion method processing for conversion of database, an apparatus, a program and a storage media of the same

BACKGROUND

According to change of enterprise scale etc., a predetermined database system may be converted to the other database systems. As technology for conversion of the database system, there is technology described in Japanese Unexamined Patent Application No. 2002-351710, for example.

The SQL sentences which can be used for a database system differs for every system as described in the Japanese Unexamined Patent Application. Then, in the system of the Japanese Unexamined Patent Application, smooth conversion of a database system is achieved by cooperating GUI technology and SQL sentence automatic conversion process.

Although the target for conversion in the Japanese Unexamined Patent is the SQL sentence itself, the target for conversion is not only the SQL sentence. Therefore, generally suitable conversion of the database system cannot be performed only by converting the SQL sentence.

For example, the case that the database system to be converted is "Access" (trademark) of Microsoft Corp., and the database system after conversion is similarly SQL Server of Microsoft Corp., will be explained.

In this case, although a view, an in-line table value function, and a stored-procedure are defined as query in the SQL Server, query of "ACCESS" have the same function, but the type in particular is not defined.

Therefore, in case that the database system which is constituted by "Access" is converted to the database system which is constituted by SQL Server, you have to convert each query of "Access" into the query of SQL Server which has a suitable type based on the contents of the query.

Therefore, it is necessary to perform judgment of the suitable type of the query after conversion in the early stage of conversion processing.

However, when determining a suitable type based on the contents of the query, in the case there are six judgment conditions for type determination, it have to perform judgment branch of 64 times. Therefore, there is a disadvantage that the processing cost needed for judgment will become great.

SUMMARY OF THE INVENTION

The present invention provides a data conversion method processing for conversion of database, an apparatus, a program and a storage media of the same which can simplify judgment processing of the query type at the time of conversion to hold down processing cost as much as possible.

To realize some of advantages described above there is provided a data conversion method for converting a first database system having a plurality of first queries into a second database having a plurality of second queries, wherein the first query permits all of parameter, processing of addition, deletion and updating with respect to a database, and becoming a child query of the other query, the second query comprises: a view type which prohibits the parameter, permits the processing of addition, deletion and update, and permits becoming a child query of the other query; a function type which permits the parameter, prohibits the processing of addition, deletion and update, and permits becoming a child query of the other query; and a stored-procedure type which permits the parameter, permits the processing of addition, deletion and update, and prohibits becoming a child query of the other query; the data conversion method comprising: determining a nest relation of a plurality of the first queries; determining the type of the second query corresponding to each of the first query by determining in turn from the first query of a bottom layer to the first query of a top layer based on the nest relation and determining the first query as a dummy type when a child query of the first query is the function type, the stored-procedure type or the dummy type; generating the second query corresponding to the first query according to the type determined by the determining type in turn from the first query of the bottom layer to top layer based on the nest relation; and generating the second query of the stored-procedure type including function description equivalent to the functional description of a target query and generating the second query of the function type including function description equivalent to the functional description of the target query with respect to the target query which is the first query judged in the determining type as the dummy type or the stored-procedure type.

There is provided a computer for converting a first database system having a plurality of first queries into a second database having a plurality of second queries, wherein the first query permits all of parameter, processing of addition, deletion and updating with respect to a database, and becoming a child query of the other query, and the second query comprises: a view type which prohibits the parameter, permits the processing of addition, deletion and update, and permits becoming a child query of the other query; a function type which permits the parameter, prohibits the processing of addition, deletion and update, and permits becoming a child query of the other query; and a stored-procedure type which permits the parameter, permits the processing of addition, deletion and update, and prohibits becoming a child query of the other query, the computer comprising: a nest relation determiner determining a nest relation of a plurality of the first queries; a type determiner determining the type of the second query corresponding to each of the first query by determining in turn from the first query of a bottom layer to the first query of a top layer based on the nest relation and determining the first query as a dummy type when a child query of the first query is the function type, the stored-procedure type or the dummy type; a query generator generating the second query corresponding to the first query according to the type determined by the determining type in turn from the first query of the bottom layer to top layer based on the nest relation, and generating the second query of the stored-procedure type including function description equivalent to the functional description of a target query and generating the second query of the function type including function description equivalent to the functional description of the target query with respect to the target query which is the first query judged in the determining type as the dummy type or the stored-procedure type.

There is provided a computer program for converting a first database system having a plurality of first queries into a second database having a plurality of second queries, wherein the first query permits all of parameter, processing of addition, deletion and updating with respect to a database, and becoming a child query of the other query, and the second query comprises: a view type which prohibits the parameter, permits the processing of addition, deletion and update, and permits becoming a child query of the other query; a function type which permits the parameter, prohibits the processing of addition, deletion and update, and permits becoming a child query of the other query; and a stored-procedure type which permits the parameter, permits the processing of addition, deletion and update, and prohibits becoming a child query of the other query, the computer program having computer instructions on a computer readable medium, the instructions being adapted to enable a computer system to perform operation, comprising: determining a nest relation of a plurality of the first queries; determining the type of the second query corresponding to each of the first query by determining in turn from the first query of a bottom layer to the first query of a top layer based on the nest relation and determining the first query as a dummy type when a child query of the first query is the function type, the stored-procedure type or the dummy type; generating the second query corresponding to the first query according to the type determined by the determining type in turn from the first query of the bottom layer to top layer based on the nest relation; and generating the second query of the stored-procedure type including function description equivalent to the functional description of a target query and generating the second query of the function type including function description equivalent to the functional description of the target query with respect to the target query which is the first query judged in the determining type as the dummy type or the stored-procedure type.

There is provided a computer-readable storage medium for converting a first database system having a plurality of first queries into a second database having a plurality of second queries, wherein the first query permits all of parameter, processing of addition, deletion and updating with respect to a database, and becoming a child query of the other query, the second query comprises: a view type which prohibits the parameter, permits the processing of addition, deletion and update, and permits becoming a child query of the other query; a function type which permits the parameter, prohibits the processing of addition, deletion and update, and permits becoming a child query of the other query; and a stored-procedure type which permits the parameter, permits the processing of addition, deletion and update, and prohibits becoming a child query of the other query, the storage medium having computer executable instructions thereon, comprising: determining a nest relation of a plurality of the first queries; determining the type of the second query corresponding to each of the first query by determining in turn from the first query of a bottom layer to the first query of a top layer based on the nest relation and determining the first query as a dummy type when a child query of the first query is the function type, the stored-procedure type or the dummy type; generating the second query corresponding to the first query according to the type determined by the determining type in turn from the first query of the bottom layer to top layer based on the nest relation; and generating the second query of the stored-procedure type including function description equivalent to the functional description of a target query and generating the second query of the function type including function description equivalent to the functional description of the target query with respect to the target query which is the first query judged in the determining type as the dummy type or the stored-procedure type.

BRIEF DESCRIPTION OF THE DRAWINGS

FIG. 2 illustrates a conversion pattern relating to the embodiment of the present invention.

FIG. 16 to FIG. 20 are figures for explaining the details of each query shown in FIG. 15.

FIG. 21 to FIG. 25 are figures for explaining the case where each processing of the type judgment step SQ203 shown in FIG. 6 is performed with respect to the code shown in FIG. 15.

Figure 7:
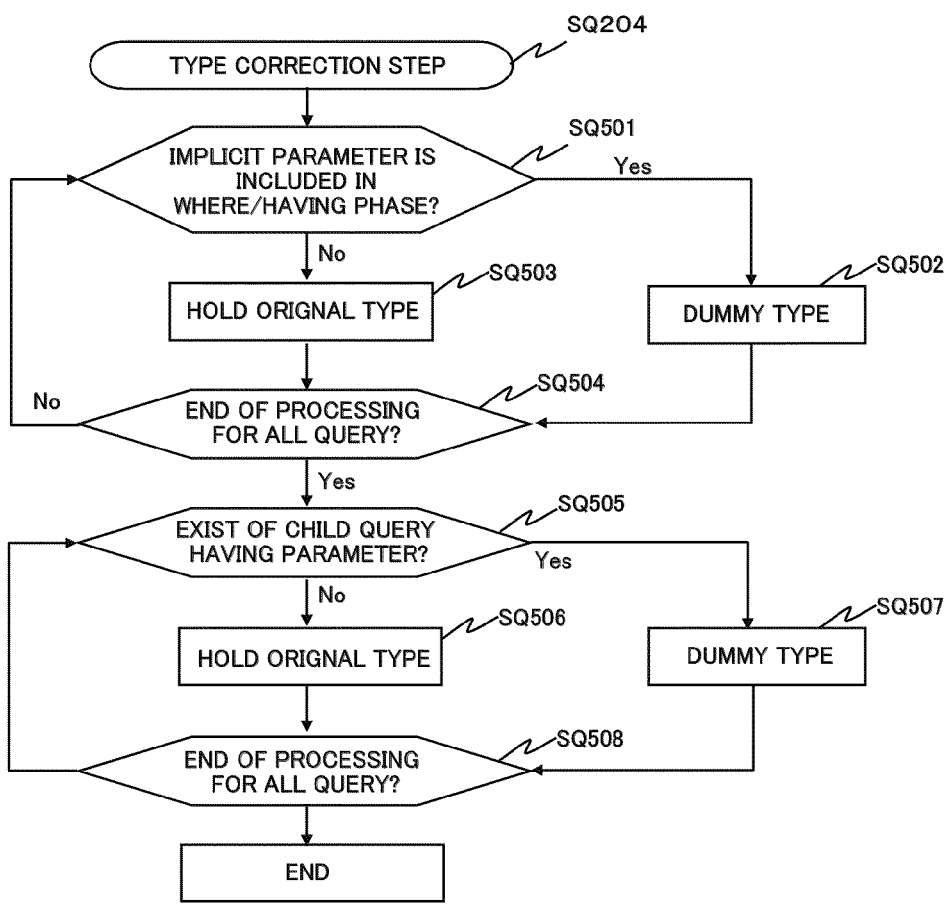
FIG. 7 is a flowchart of type correction step shown FIG. 4.

The FIG. 31 to FIG. 35 are figures for explaining the case where the steps SQ505 to SQ508 of type correction step SQ204 shown in FIG. 7 to each code is processed.

Figure 11:
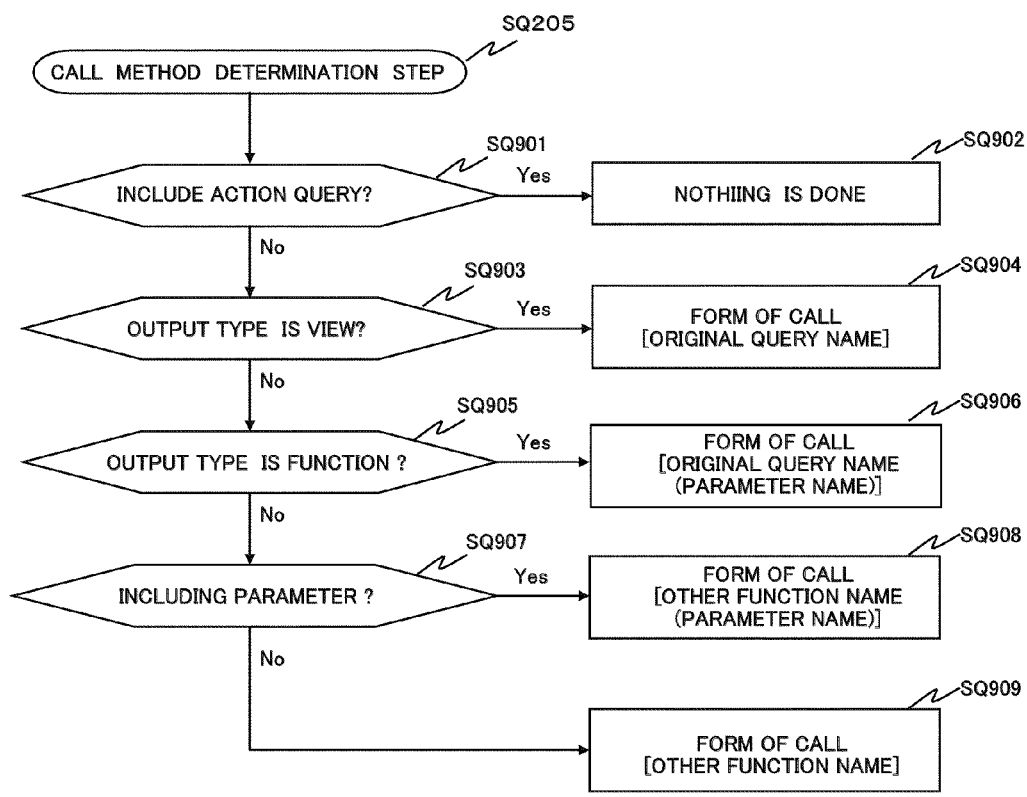
FIG. 11 is a flowchart of call method determination step shown FIG. 4.

The FIG. 36 to FIG. 40 are figures for explaining the case where the call method determination step SQ205 which is shown in FIG. 11 to each code is processed.

Figure 12:
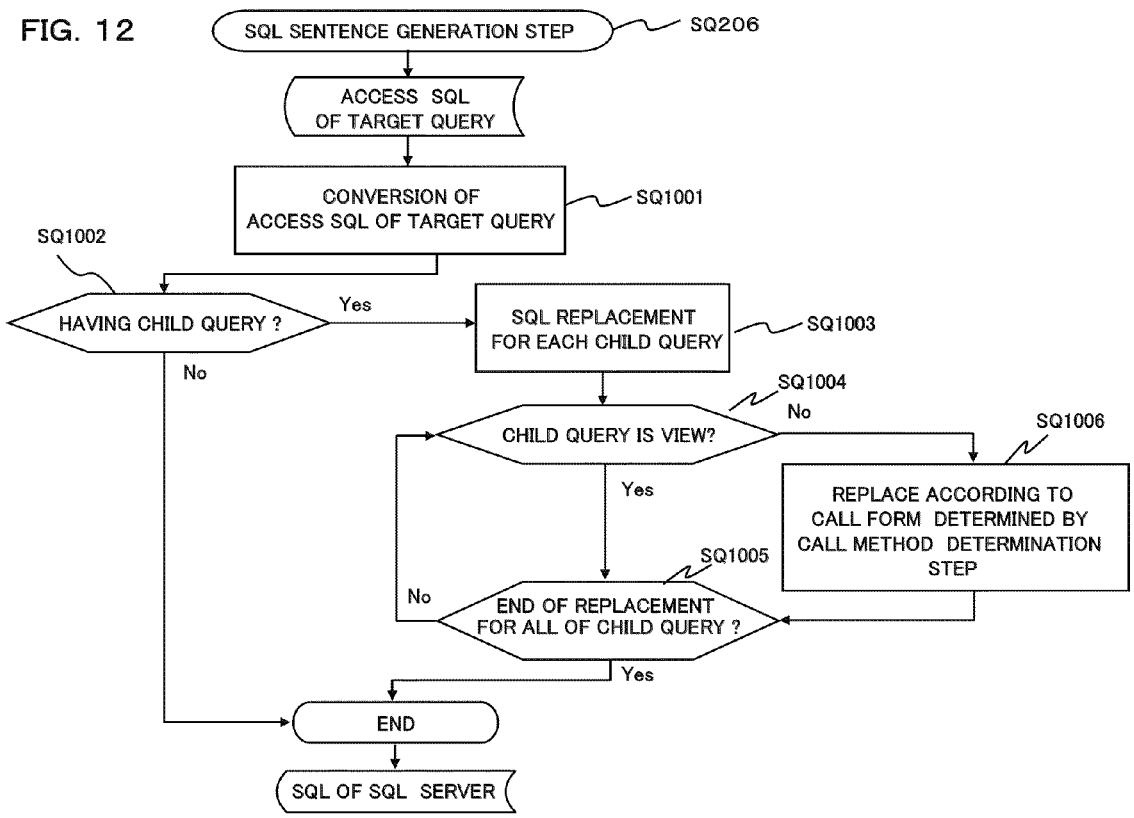
FIG. 12 is a flowchart of SQL sentence generation step shown FIG. 4.
Figure 40:
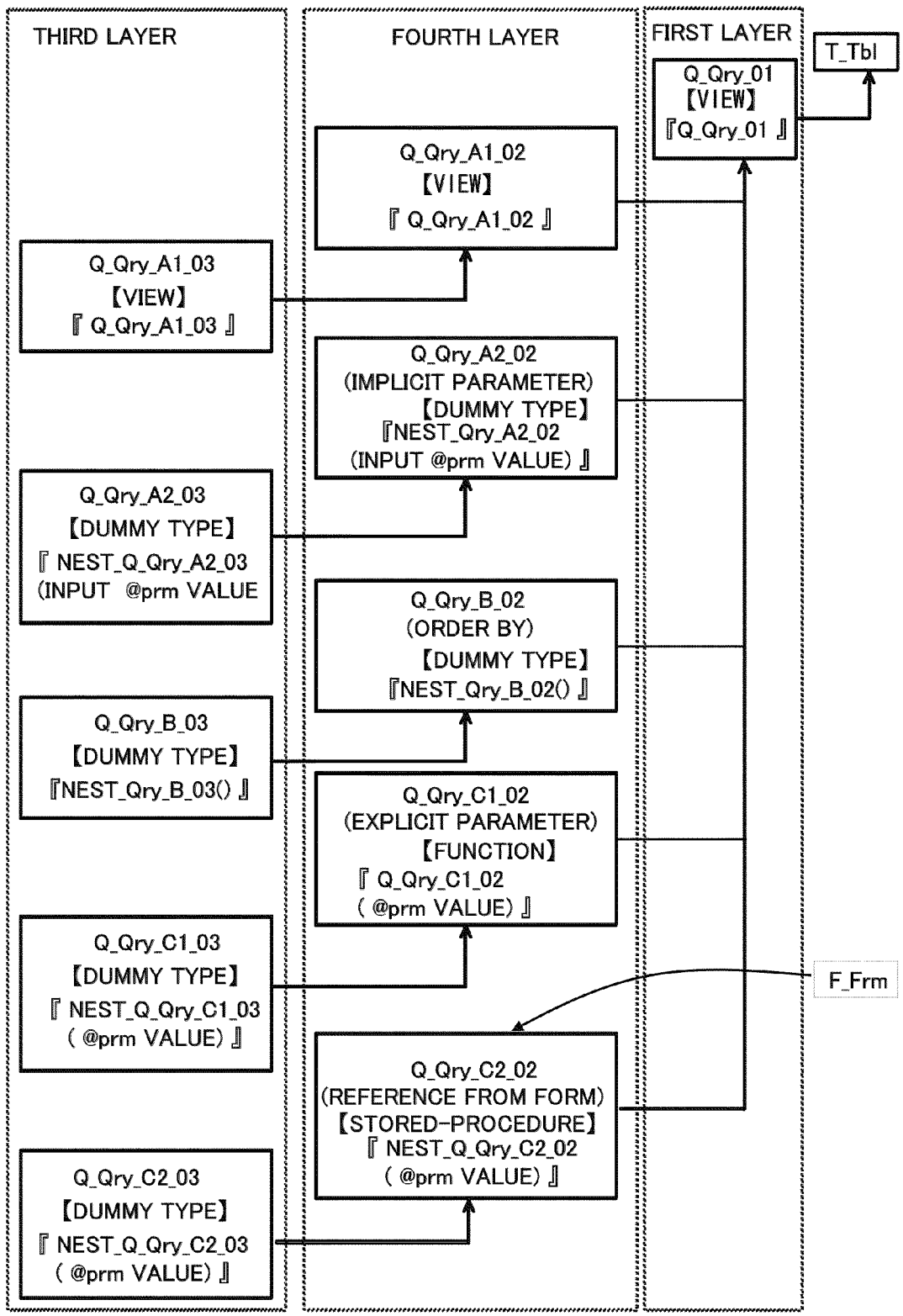

The FIG. 40 to FIG. 41 are figures for explaining the case where the SQL generation step SQ206 shown in FIG. 12 to each code is processed.

Figure 5:
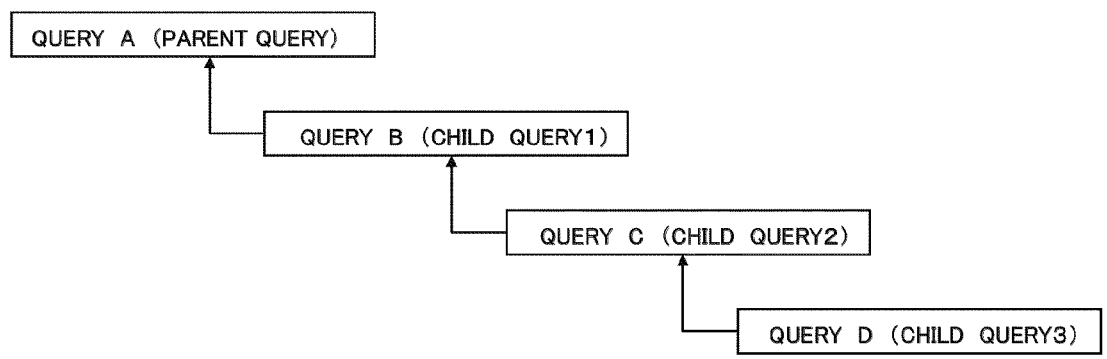
FIG. 5 is an example of processing result of the data conversion apparatus shown in FIG. 3.
Figure 13:
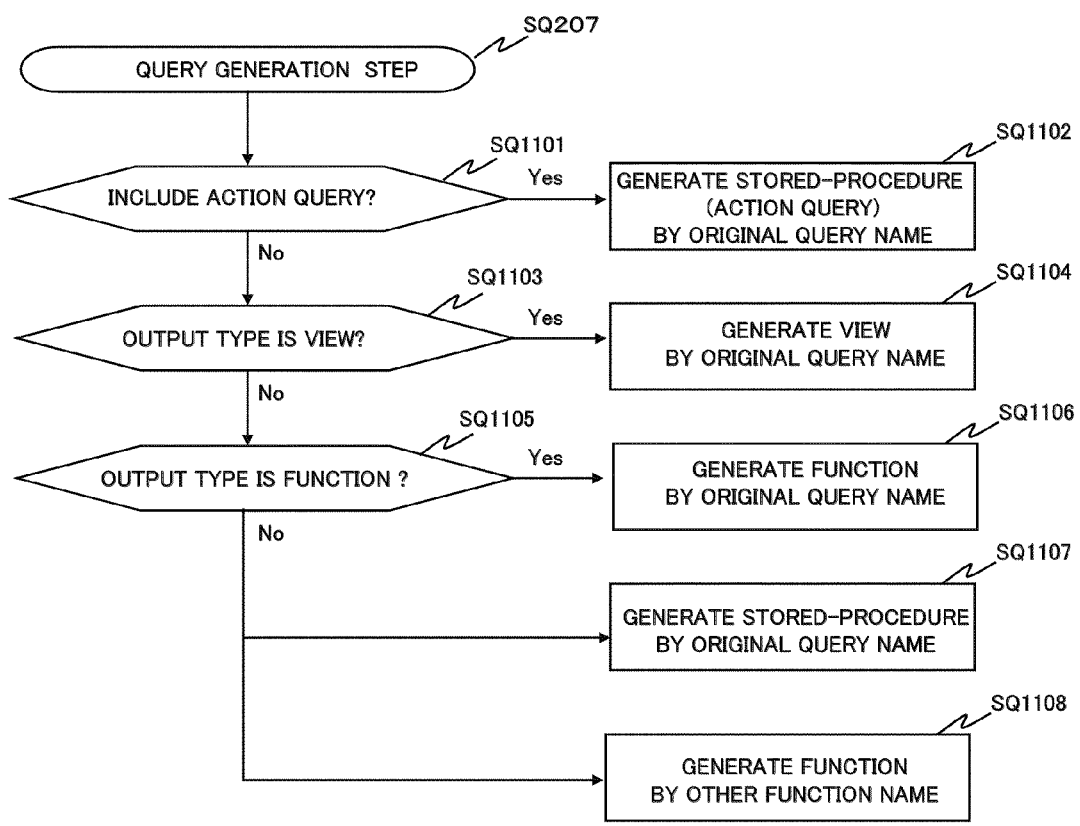
FIG. 13 is a flowchart of query generation step shown FIG. 4.

The FIG. 5 to FIG. 61 are figures for explaining the case where the query generation step SQ207 shown in FIG. 13 to each code is processed.

Figure 62:
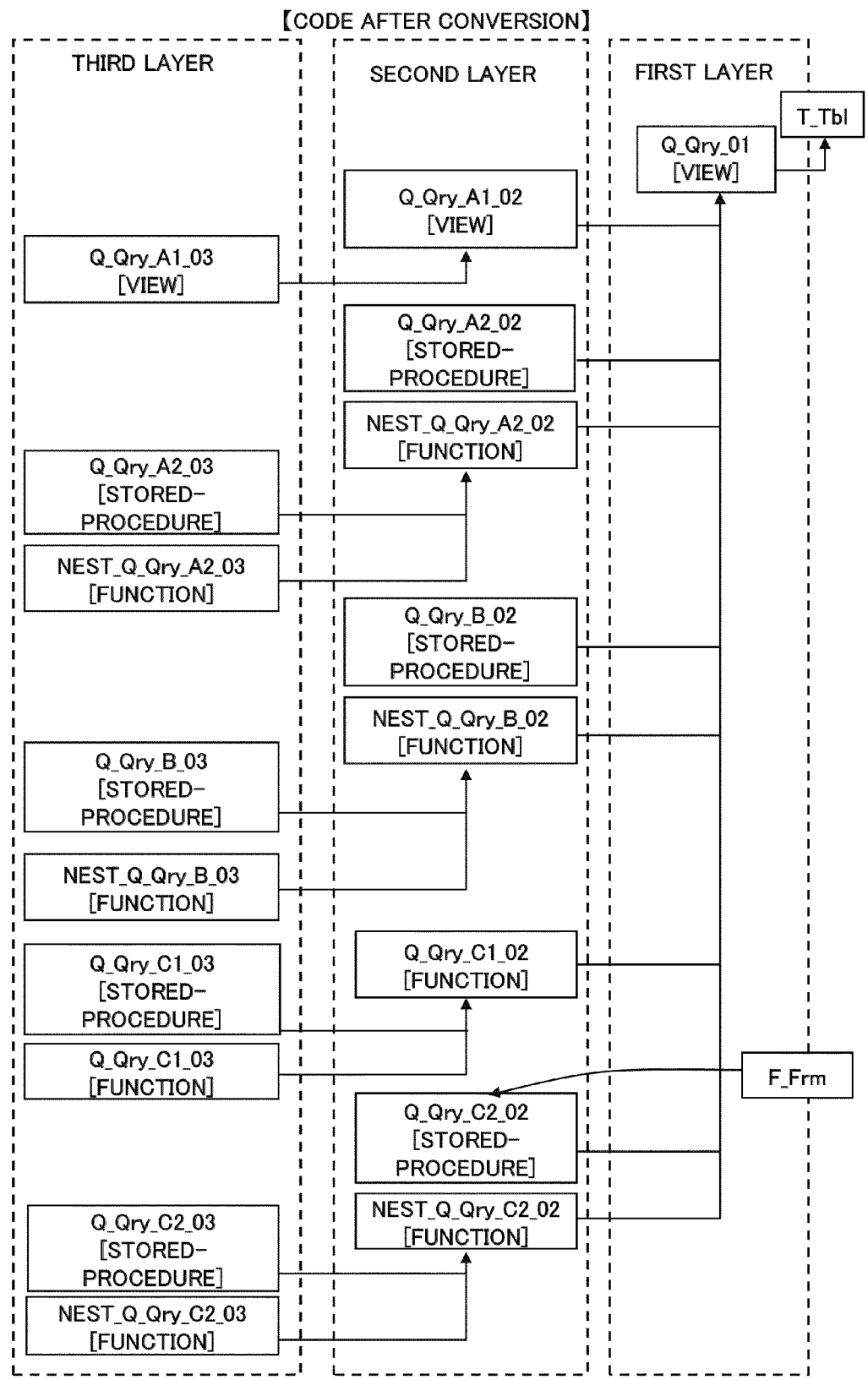

FIG. 62 shows the codes of SQL SERVER after conversion generated by the data conversion apparatus 1 via processing of the FIG. 31 to FIG. 61 mentioned above.

THE PREFERRED EMBODIMENT OF THIS INVENTION

Hereafter, the data conversion apparatus relating to the embodiment of the present invention will be explained.

The example where the relational database system to be converted is "ACCESS" of Microsoft Corp. and the relational database system after conversion is SQL server of Microsoft Corp. will be explained.

Note that, the database system to be converted and the database system after conversion are not limited to these.

By the way, in a relational database system, the command of search of data, updating, deletion, etc., is issued to the system by using a query of a character string. In a search query, the extraction conditions of the target table or data, how to arrange, etc. are specified. The query generated once is saved and can be used repeatedly. A relational database uses language called SQL for description of a query in the system.

In a general-purpose relational database such as "Access" of Microsoft Corp. (an example of the first database system of the present invention), the type of the query is defined so that beginners can also program rather than performance or scalability.

On the other hand, in more advanced databases (an example of the second database system of the present invention), such as SQL Server, two or more types of queries are prepared and restrictions of the description method etc. are prepared about each query. This is for raising the performance and scalability of application based on the database.

For example, existence of the rearrangement sentence (ORDER BY) of items, existence of a parameter, existence of an addition, deletion, and an update process, and existence of the nest from other queries is used as conditions for constrain. Three query types are defined by combining the conditions for constrain as shown in the following table 1.

Two or more of these queries are classified into three types of a "view", a "table function", and a "stored-procedure."

[Table 1]

The database conversion system of the present embodiment converts each of the query of "Access" (it is hereafter described also as an original query) into the query of SQL Server ((it is hereafter described also as a converted query) of suitable type based on the contents of the original query.

"The nest from other queries" indicates that the query is a child of other queries.

"Addition, deletion and updating processing" are functions required at the time of the call from form.

"Form" is used for starting input box on a screen. It needs the functions, such as addition, deletion and updating processing.

In Table 1 mentioned above, the reason for technical of the part which is shown as prohibition (No) will be explained below.

The reason that the view does not include an "ORDER BY" phrase.

The SQL grammar permits including "ORDER BY" phrase. However, when performing the view, database engine optimizes to perform by the execution plan in which performance is important, and does not return the rearranged result. The rearrangement processing may scan all the data and this may generally return a result in the right order. So that the load of processing is high. Since priority is given to performance to the view used on various aspects of affairs, it is defined in this way. On the other hand, the stored-procedure is not optimized to fall performance, but it is possible to return the rearranged result as it is.

[The Reason the View does not Include a Parameter]

Narrowing down by the parameter specification which needs all the line scans is prohibited from a viewpoint of performance like the reason of the "ORDER BY" phrase.

[The Reason that the Function Cannot Add, Update and Delete]

The result returned from the view and the stored-procedure is returned to the value of the table of an original database (memory) in the state which can be referred to directly. That is, change of the returned result in changes of the value of actual data.

On the other hand, in case the function is performed, database engine generates the table internally temporarily. This is for avoiding the record locking of the original table and not doing an obstacle to other operations. A result is inserted in a temporal table and the temporal table is returned as a result. For this reason, the returned result cannot perform direct reference to the value of a table. Moreover, since the temporal table is passed as mentioned above, generation and deletion of the temporal table are repeated at the time of execution, and performance is always low.

[The Reason the Stored-Procedure Prohibits the Nest from Other Queries]

The stored-procedure is used in order to make two or more SQL sentences into batch processing with a name and to enable reuse of them. It is also possible to return two or more results depending on the contents of the stored-procedure, and it is also possible not to return a value.

Since the data type use as return is not a table data type, usage for acquiring a result in the SQL (used as a table in the "FROM" phrase) is not permitted on grammar. That is, what can be used as a table within a FROM phrase in SQL is a return value of the view and the function which returns a table type value.

Hereafter, three types of the query specified by SQL SERVER (database system after conversion) will be explained.

[View]

Performance of the view is higher than the function and the stored-procedure. The view searches and takes out the item specified with the "SELECT" phrase from the table which is specified with the "FROM" phrase. Moreover, the view can specify a search condition with the "WHERE" phrase.

[Function]

In the present embodiment, functions are table functions, such as an in-line table value function or two or more statement table value function.

The function has the following characteristics besides restrictions of the above-mentioned table 1, for example.

The function dose not include an action query.

The function has certainly a table type return value.

Here, an action query means the query which performs a certain action of deletion, updating, or an addition to a table record. Specifically, the query includes a DELETE sentence, a UPDATE sentence, an INSERT sentence, or a SELECT INTO sentence.

Since queries, such as ACCESS, always comprised a single SQL sentences, they are equipped with the function necessary for an in-line table value function.

The reason for defining the number of the SQL sentence of the in-line table value function single is that reference origin of data, extraction conditions, the item name and data type of a table value which are returned as a result can be determined from a single SQL sentence.

The two or more statement table value functions are table value functions which defines a variable inside and can perform control statements (IF ELSE etc.). Unlike the in-line table value function, it have to declare clearly the item name and data type of the part which can perform complicated control, and the table value returned as a result.

These table value functions become a powerful tool which replaces the view. A table value function can be used at the place which can specify the table type or view type in a query. The two or more statement table value functions can include an additional statement which can use higher logic than logic used in the view.

The table value function can also be used instead of the stored-procedure as for which a single result returns a set. Although the table returned with a table value function can be referred to from the "FROM" phrase of an SQL statement, since it is not a table type, the value returned from the stored-procedure cannot be referred to.

Note that, the function may make a query and the query may be referred to in form. Therefore, when it has the child query of the function, it is judged that there is possibility of data manipulation.

TABLE 1

| | QUERY TYPE (SQL SERVER) | | |
|---|---|---|---|
| | VIEW | FUNCTION | STORED-PROCEDURE |
| INCLUDING "ORDER BY" PAHSE | x | o | o |
| INCLUDING PARAMETER | x | o | o |
| ADDETION, DELATION, UPDATE | o | x | o |
| NEST FROM OTHER QUERY | o | o | x |

[Stored-Procedure Type]

The stored-procedure has the following characteristics besides restrictions of the above-mentioned table 1, for example.

The degree of performance is middle.

It may include an action query. An action query can have only stored-procedure type.

Although the existence of the return value is arbitrary, the return value is only a value type and is not a table type.

Memory Cache is permitted.

The SQL Server (database) includes individual data and secret data. When permission is given to users at any time, the security and confidentiality of this information may sometimes be threatened.

Therefore, the stored-procedure which has structure permitting change of only few portions is used.

The stored-procedure is the function of the standard foundation for SQL. Only database administrator can determine the query which is executed by the database in advance. This is similar with the function in a typical programming language. This query prior determination can provide with security and performance predictability. Many users of the relational database depend on the stored-procedure to make arbitrary queries not to be consumed by the database.

In the case of the stored-procedure, "CREATE PROCEDURE [stored-procedure name]" is used, for example. Keywords called "PROCEDURE" are directions of stored-procedure generation. The SQL sentence to define is described after "AS" phrase. The stored-procedure generated in the "CREATE" sentence is stored on a database server like the view. The stored-procedure defined once can also be called from other users, if authority is set up.

The SQL sentence defined as "AS" phrase can use almost all SQL sentences including "SELECT" statement. Moreover, specification of not only one SQL sentence but two or more SQL sentences is possible. Although execution of an SQL sentence is fundamentally carried out in order of the defined turn, it is possible to control the order of execution like other languages, or to also make it repeat.

In the simple function "calling the "SELECT" statement which named and saved the name on the database", the stored-procedure is the same as the view. The stored-procedure demonstrates its ability at the time of execution by "SQL SERVER". The main purposes which save the program in the database are as follows.

Prevent inconsistency of data by communalizing and mounting processing to the database used repeatedly.

By performing the inquiry by the complicated conditions which cannot be processed in an independent "SELECT" statement not on a client program but on a database, the amount of communications between the client and the database is reduced, and response time is shortened.

If a series of processing are collectively generated by the stored-procedure, the inquiry in a database just needs to call the stored-procedure once. In the system which processes the order from a lot of customers, it becomes possible to reduce the amount of communications between the client and the database sharply.

That is, SQL Server (database system) carries out processing of the stored-procedure by executing codes for addition, change, and deletion of the value of the table of an original database. When a final result comes out, it is returned to the client from SQL Server.

On the other hand, if it tries to perform the same processing by function, the addition, the updating and the deletion of a table cannot be performed during execution.

As mentioned above, a general-purpose related database, such as "ACCESS", dose not define type of query so that beginners can also program rather than performance or scalability.

On the other hand, in more advanced databases, such as "SQL SERVER", in order to raise the performance and scalability of application based on a database, the two or more type of queries are prepared, and the restrictions of the description method etc. are prepared about each query.

Therefore, when converting "Access" query to "SQL Server" query, you have to determine the type of a suitable "SQL Server" query, considering various conditions.

The data conversion apparatus of the present embodiment converts the SQL statement for "ACCESS" used in "ACCESS" to suitable SQL for SQL Server based on the conversion pattern shown in FIG. 2 using the constraints of Table 1 mentioned above. Consequently the data conversion apparatus generates query which may be used in SQL Server by using the SQL statement generated.

The conversion pattern shown in FIG. 2 is generated so that higher performance and higher operativity can be acquired, based on the constraints shown in Table 1 of a SQL Server query mentioned above, and the characteristic mentioned above.

That is, although many conversion patterns can be considered, the conversion pattern shown in FIG. 2 is very excellent from the field of performance and operativity.

In the present embodiment, the query of which the type in the database after conversion can be determined based on the contents of the query in the database to be converted uses the type.

Further the query of which type cannot be judged among the queries in the database to be converted is judged as the dummy type (the other type), and even if it is any type, a query is generated so that the function thereof may become the same.

In the data conversion apparatus of the present embodiment, in a type determination step, when the child query of the query in a database system to be converted is the function type, the stored-procedure type, or the dummy type, the query is judged as the dummy type. This is because one query after the conversion which certainly fills the required function of the query to be converted cannot be specified.

And about the query to be converted judged as the dummy type or the stored-procedure type, the data conversion apparatus generates the query of stored-procedure type and the query of function type as the query after conversion. Both of the query after conversion includes a function description equivalent to the functional description of the query to be converted.

Because the operativity of the query to be converted over the child query thereof will be high, the query after conversion of the stored-type which includes functional description equivalent to the functional description of the query to be converted is generated.

Further because there is possibility that a parent query of the query to be converted exists, the query after conversion of the function type which includes functional description equivalent to the functional description of the query to be converted is generated.

The dummy type is a type virtually specified in a processing process, and it is not defined by the database system to be converted and after conversion. The type is used for the condition judgment which selects the generation method which generates the query after conversion.

That is, about the target query to be converted which is judged as the dummy type (In case that the child query is a table function type, a stored-procedure type, or the dummy type), since it may be data manipulation (addition, deletion, and update process), the query after conversion of the stored-procedure type which permits these is generated.

In addition, the function may make a query and the query may be referred to in form. Therefore, when it has the child query of the function, it is judged that there is possibility of data manipulation.

Further, about the query to be converted which is judged as the stored-procedure, the query after conversion of the stored-procedure is generated.

Here, the query after conversion of the stored-procedure type is prohibited the nest from other queries (FIG. 2). On the other hand, the query after conversion has a possibility of becoming a child of other queries.

Therefore, the query after conversion of the function type including functional description equivalent to the functional description of the target query is generated.

At this time, name different from the name of the stored-procedure type of the query after conversion are used for the name of the function type of the query after conversion, for example.

Although two queries after conversion of the stored-procedure type and the function type are generated about the target query which is judged as the dummy type. The both sides of the data manipulation function to a lower layer query and the functional exertion as a function type in the case of having a parent query can be achieved.

Thus, in all the cases, about the query judged as the stored-procedure or the dummy type, the query after conversion of the function type is generated with the query of the stored-procedure type of the same function. Consequently even when there is a parent query, problem is not occurred. Though the number of useless queries increases by this, when extension of the application after conversion is assumed, the heavy work which generates the functions manually can be reduced sharply.

Large work mitigation can actually be achieved, at the spot of tool development by the system which uses the data conversion apparatus of the present invention. When performing synthetic application conversion called upsizing, there may be functions never unrealizable only by conversion of a query. Although new queries are generated using the existing query, the work cost changes a lot whether the function capable of being nested is already generated or not. It is the technology which noted that making is serious, but erasing is easy.

Hereafter, the example of the data conversion apparatus relating to the embodiment of the present invention will be explained.

Figure 1:
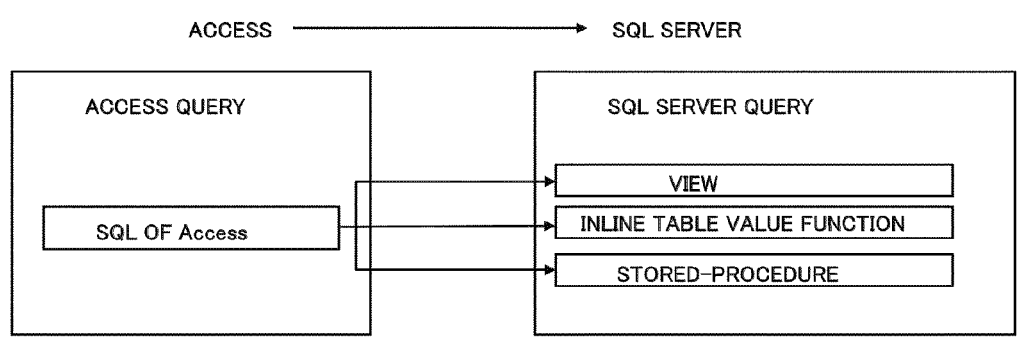
FIG. 1 is a conception view of processing of data conversion apparatus relating to the embodiment of the present invention.
Figure 3:
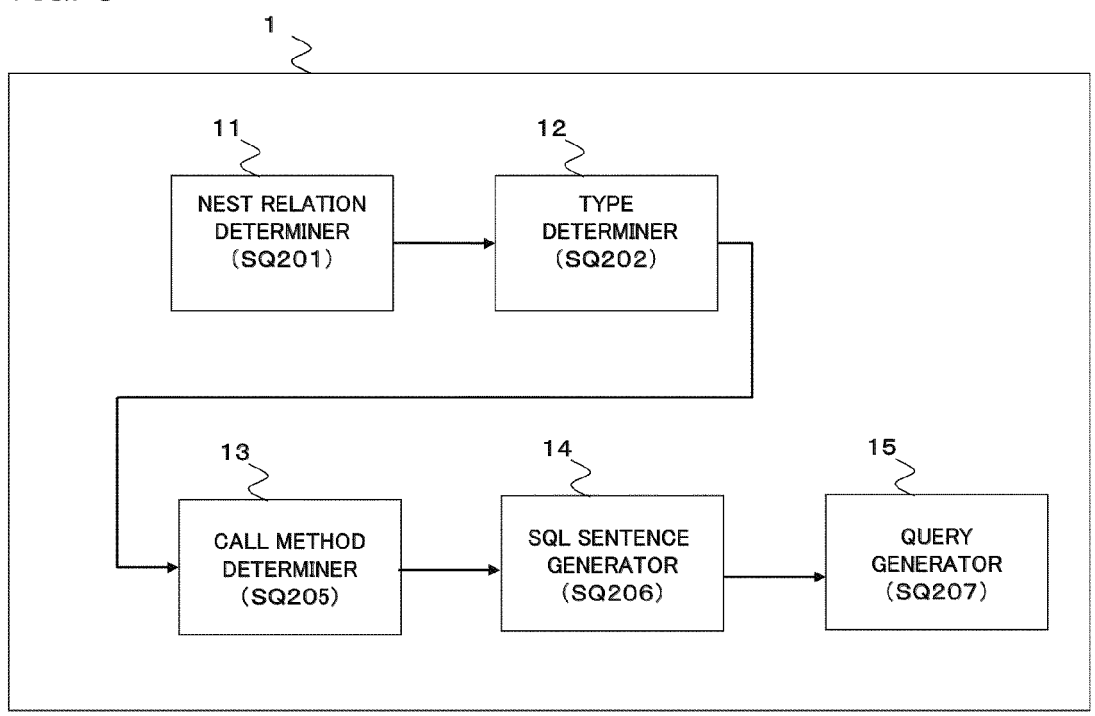
FIG. 3 is a functional block diagram of the data conversion apparatus relating to the embodiment of the present invention.

FIG. 3 is a functional block diagram of the data conversion apparatus relating to the embodiment of the present invention.

Figure 4:
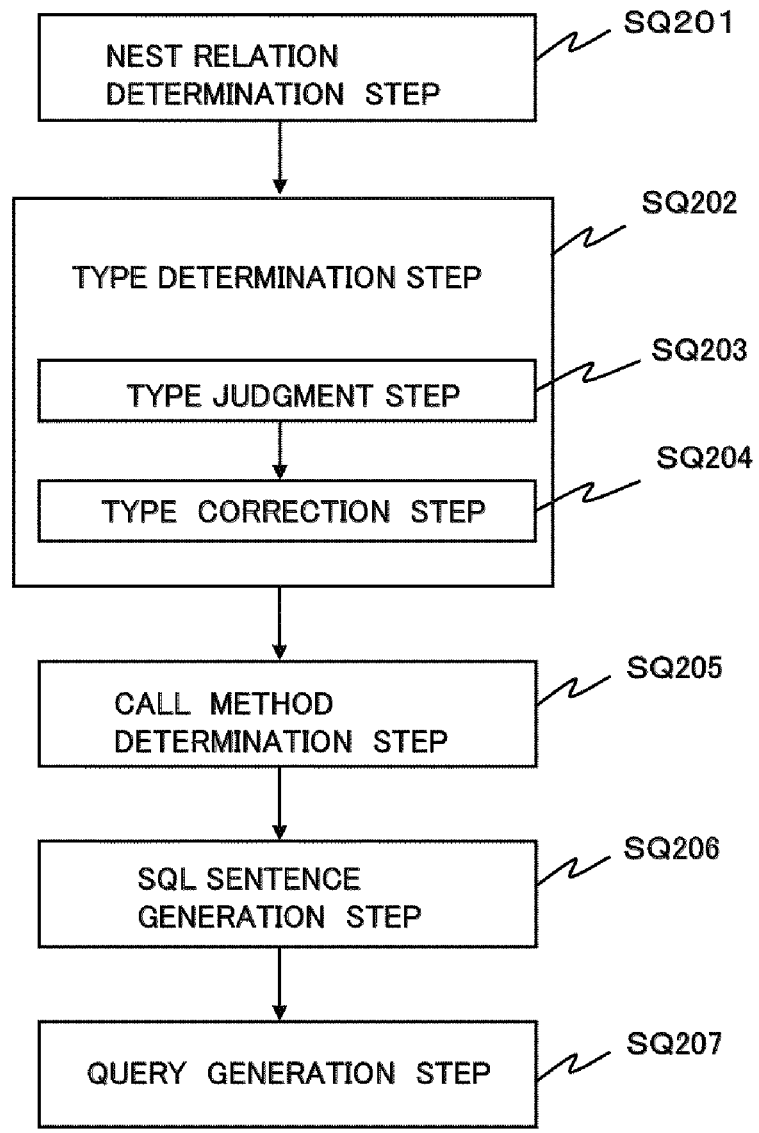
FIG. 4 is a processing flow diagram of the data conversion apparatus relating to the embodiment of the present invention.

The nest relation determiner 11 shown in FIG. 3 performs the nest relation determination step SQ201 shown in FIG. 4. The type determiner 12 performs the type determination step SQ202. The call method determiner 13 performs the call method determination step SQ205. The SQL sentence generator 14 performs the SQL generation step SQ206. The query generator 15 performs the query generation step SQ207.

[Nest Relation Determination Step SQ201]

The nest relation determination step SQ201 determines whether or not it has a nest relation of the query of "Access".

That is, the step determines the relation referred to from other queries.

When the nest relation of four queries illustrated in FIG. 5 is explained, Query C will be generated with reference to Query D, Query B will be generated with reference to the generated query C concerned, and Query A will be generated with reference to Query B.

Here, in the following explanation, when two adjoining queries are made into an example, the query which refers to is expressed as a parent query and the query which is referred from is expressed as a child query.

In the example of FIG. 5, the Query C is a parent query of the Query D, the Query D is a child query of the Query C. Further the query which is referred from is located in lower layer with respect to the query which refers to. The query which refers to is located in upper layer with respect to the query which is referred from.

In the example of FIG. 5, Query D is located in lower layer from Query C, and Query C is located in upper layer than Query D. Moreover, among four queries A, B, C, D, the query D is located in bottom layer, and the query A is located in top layer. the nest relation determination step SQ201 of the present invention, determines the position relationship of upper layer and lower layer about the reference relation between queries.

Based on the nest relation concerned, the type determination step SQ202 determines the type of the queries of which the nest relation mentioned above has been specified sequentially from the query of a bottom layer to the query of a top layer. It is determined as any of a total of four types including the dummy type, in addition to three types (the view, the function and the stored-procedure) used by SQL Server with respect to each query.

As mentioned above, the type determination step SQ202 includes type judgment step SQ203 and type correction step SQ204.

As an outline of operation of each step, the type judgment step SQ203 judges the type of each query from bottom layer.

After judgment of all the queries, the type correction step SQ204 corrects the type of each query if needed. Thereby, finally the type of all the queries is determined. Hereafter, it will be explained concretely using a flow chart.

[Type Judgment Step SQ203]

Figure 6:
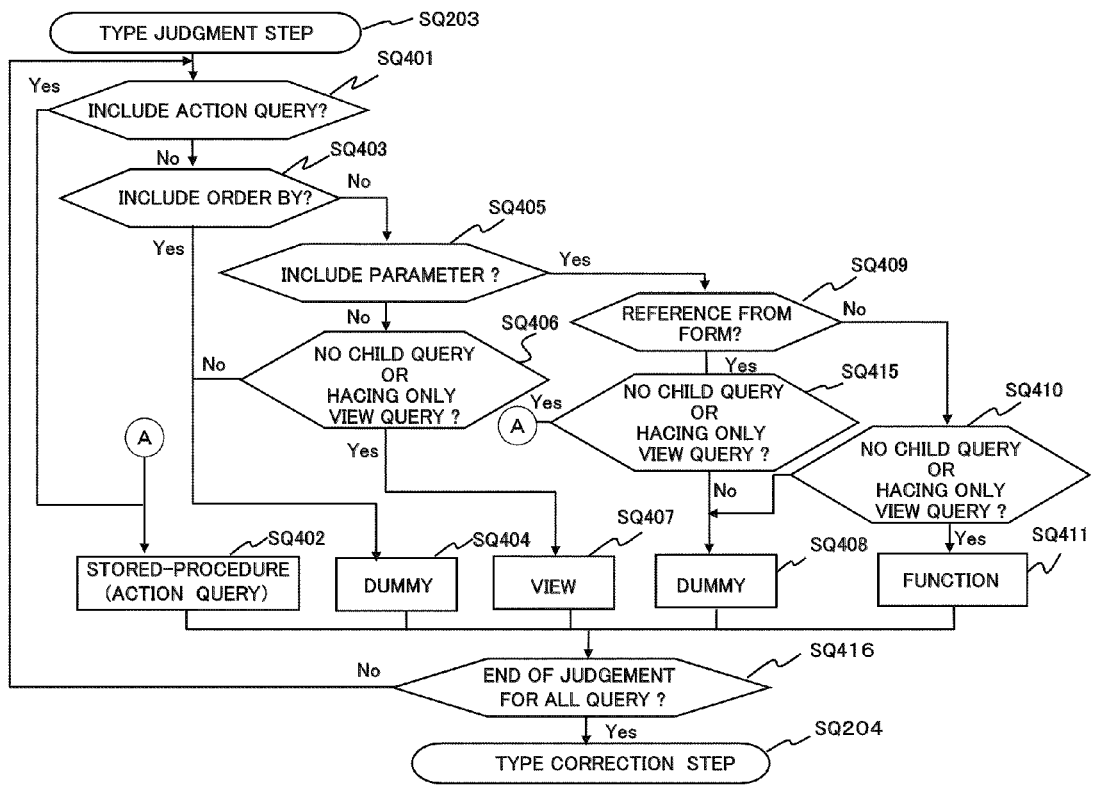
FIG. 6 is a flowchart of type determination step shown FIG. 4.

FIG. 6 is a detailed flow chart of the type judgment step SQ203 shown in FIG. 4.

As shown in FIG. 6, the type judgment step SQ203 judges first whether it is the action query which is the target query mentioned above (SQ401).

When it judges that the target query is an action query, the query concerned is judged as the stored-procedure (SQ402).

When it is not an action query, it is judged whether it is a query including the "ORDER BY" phrase (SQ403).

When the "OREDER BY" phrase is included, the query concerned is judged as the dummy type (SQ404).

When the "ORDER BY" phrase is not included, it is judged whether the parameter is included in the query concerned (SQ405). Here, the query including the parameter is the query including a PARAMETER sentence, the query including "refer to the value to an Access object", and the query including a direct entry parameter.

When the parameter is not included, it is judged whether the query concerned dose not have a child query or have only child of the view type (SQ406). When it is right, the query concerned is judged as the view type (SQ407), and when it is not right, the query concerned is judged as the dummy type (SQ408).

On the other hand, when the parameter is included (it is "Yes" at SQ405), it is judged whether the query concerned is referred to in form (SQ409). When it is referred to, the query concerned is judged as the dummy type (SQ408). When it is not referred to, it is judged whether the query concerned has a child query and whether the child query is the "view" (SQ410). When it is right, the query concerned is judged as the function type (SQ411), and when it is not right, the query concerned is judged as the dummy type (SQ408). Thus, the judgment type of each query is carried out sequentially from the query of a bottom layer (SQ411). And after the judgment about all the queries has completed (SQ416), it progresses to the type correction step SQ204.

[Type Correction Step SQ204]

The type correction step SQ204 corrects the type of the query to be corrected judged in the above-mentioned the type judgment step SQ203 into a suitable type.

In addition, the type correction step SQ204 is carried out sequentially from the query of a bottom layer as well as the type judgment step SQ203.

As shown in FIG. 7, specifically, it is judged whether an implicitness parameter is in the "WHERE" phase or "HAVING" phase of the target query (SQ501). Here, an implicitness parameter is parameter including processing to which the input of a parameter is urged to a user by displaying an input box.

When the implicitness parameter is included in the query concerned, the type of the query concerned is corrected in the dummy type (SQ502). When the implicitness parameter is not included in the query concerned, the type of the query concerned is held (SQ503).

Thus, after having processed to all the queries (SQ504), it is judged whether there is any child query which has a parameter in order from the query of a bottom layer again (SQ505).

When there is no child query with a parameter, the type of the query concerned is held as it is (SQ506). When there is a query corrected into the dummy type by discovering the implicitness parameter, all the queries of the upper layer from the query will have a child query with a parameter, and these are corrected into the dummy type (SQ507).

Thus, if the correction of all the queries is completed (SQ508), the type correction step SQ204 will be ended.

The processing of the type determination step SQ202 will be explained with reference to the example of the query of "Access" comprising four query shown in FIG. 8, FIG. 9, and FIG. 10.

Note that, in the figures, although the type of the query is already indicated, the type is determined by the type determination step from the query (query D) of bottom layer.

Figure 8:
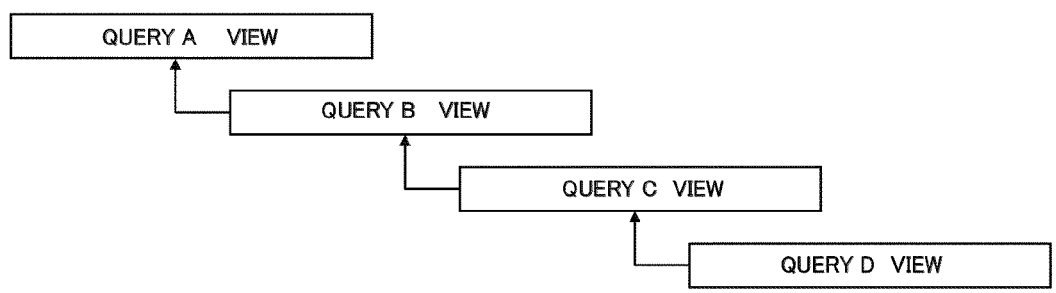
FIG. 8, FIG. 9 and FIG. 10 are examples of processing result of the data conversion apparatus shown in FIG. 3.

Explanation of the example of FIG. 8 will made. The type of the query D of bottom layer is judged according to the procedure shown in FIG. 6.

Here, it is assumed that Query D does not include the action query (SQ401), does not include the "ORDER BY" phrase (SQ403), and does not include the parameter (SQ405). Furthermore, since Query D is located bottom layer (SQ406), the query does not have a child query. Therefore, Query D is judged as the "view" (SQ407).

Next, the type judgment step SQ203 judges a type of Query C. It is assumed that Query C does not include the action query (SQ401), does not include the "ORDER BY" phrase (SQ403), does not include the parameter (SQ405). Moreover, the query D which is a child query of Query C is the "view" (SQ406). Therefore, Query C is judged as the "view" (SQ407).

It is assumed that Query B and Query A do not include the action query (SQ401), do not include the "ORDER BY" phrase (SQ403), do not include the parameter (SQ405) like Query C. Moreover, since the child query of each query is judged as the "view" (SQ406), type of each query is judged as the "view." Thus, the type is judged in order from Query A to Query D.

Next, it progresses to the type correction step SQ204, and processing is performed according to the procedure shown in FIG. 7 in order from Query D to Query A.

Supposing there is no implicitness parameter in all the queries in this case (SQ501), the type of all the queries will be held with the "view" (SQ503, SQ504, SQ505, SQ507, SQ508).

Figure 9:
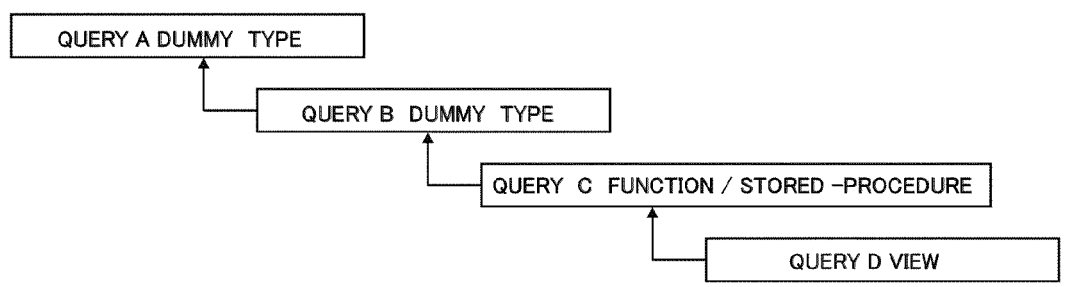

Next, for example, as shown in FIG. 9, Query D is judged as the "view." In the judgment stage of Query C, Query C is judged that it does not include the action query (SQ401), does not include the "ORDER BY" phrase (SQ403), and does not include the parameter (SQ405).

Further, since the type of Query D which is a child query of Query C is the "view" (SQ410), Query C will be judged as the "function" (SQ411).

Then, although Query B does not include the action query (SQ401), does not include the "ORDER BY" phrase (SQ403), does not include the parameter (SQ405), since Query C which is a child query does not include the parameter (SQ406), it is judged as the dummy type (SQ408). Similarly, although the Query A, does not include the action query (SQ401), does not include the "ORDER BY" phrase (SQ403), does not include the parameter (SQ405), since the Query C which is a child query includes the parameter (SQ406), it is judged as the dummy type (SQ408).

Next, it progresses to the type correction step SQ204, and processing is performed according to the procedure shown in FIG. 7 in order to Query A from Query D.

Supposing there is no implicitness parameter in all the queries in this case (SQ501), about Query C and Query D, the type of the queries will be held as it is (SQ503, SQ504, SQ505, SQ507, SQ508). Since about Query A and Query B, the query C which is a child query has a parameter, it is corrected into the dummy type on the processing (SQ506).

Note that, since Query A and Query B are judged as the dummy type, there the type is not changed.

Next, the type determination of a series of queries in which an implicitness parameter is included and which have other queries will be explained.

Figure 10:
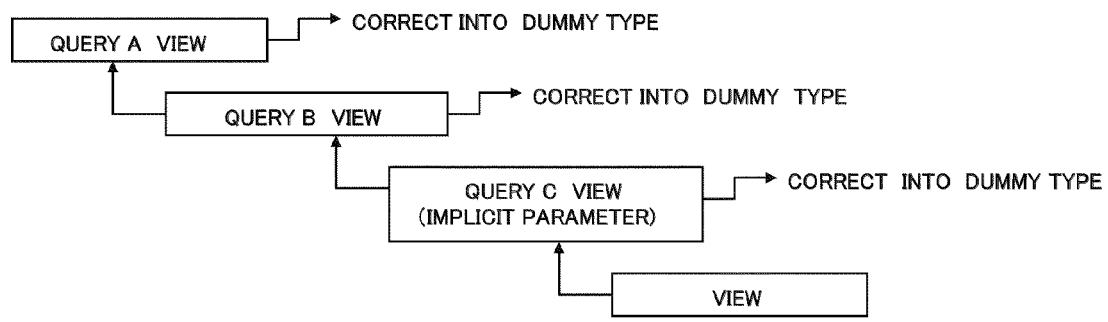

As shown in FIG. 10, the example will be explained that after all the queries are judged as the "view" in the type judgment step SQ203, Query C is a target of processing in the type correction step SQ204. In this example, as shown in FIG. 7, since Query C has an implicitness parameter (SQ501), the type is corrected from the "view" into the dummy type (SQ502).

Supposing there is no implicitness parameter in Query A and Query B, these types will be held with the view type (SQ503).

However, since the parameter was included in Query C, Query A and Query B have a child query with a parameter (SQ505), it is corrected into the dummy type (SQ507).

In addition, except the query including an action query, about the query of upper layer rather than the query judged as the function or the stored-procedure type, it is judged as "Yes" in the SQ403, as "No" in the SQ406, as "Yes" in the SQ409 or as "No" in the SQ410. Therefore, it is judged as the dummy type in all the cases.

Therefore, it is possible that it is judged as the dummy type at the time when the query is located at upper layer than the query which is judged as the function or the stored-procedure type, and the query is not action query in the type judgment step SQ203.

[Call Method Determination Step SQ205]

The call method determination step SQ205 determines call method of the case the query is called as a child query with respect to all the queries of "Access" converted into the four types.

As shown in FIG. 11, the call method determination step SQ205 judged whether an action query is included in each query (SQ901). Nothing is done when the action query is included (SQ902). When the action query is not included, it is judged whether the type is the view (SQ903).

When the type is the view, the query concerned is called by the original query name, i.e., the name used by "Access" (SQ904).

When the type is not the view and the type is the function (SQ905), it is called by using the original query name and in the form of parameter (SQ906).

Furthermore, when the type is not the function, and there is a parameter (SQ907), it is called by using a query name other than the original query name and in the form of parameter (SQ908).

Moreover, when there is no parameter, it calls only by a query name other than the original query name (SQ909). Thus, the method of calling when each query is called as a child query is determined.

[SQL Generation Step SQ206]

Based on the SQL sentence used by "Access", the SQL generation step SQ206 which generates suitable SQL for SQL Server will be explained.

When the SQL generation step SQ206 generates suitable SQL for SQL Server, in the case that the description (how to call) for calling a child query is included in the target query, the description concerned is replaced with the method of calling determined by the call method determination step SQ205 which was mentioned above if needed.

As shown in FIG. 12, the SQL generation step SQ206 converts the Access SQL of the target query into SQL for SQL Server (SQ1001).

Here, it judges whether the target query has a child query (SQ1002). When it judges it has a child query, it starts replacing processing of the converted SQL sentence with respect to each child query (SQ1003).

Here, it is judged whether the child query is the view (SQ1004). And when it is the view, no replace processing are performed but it progresses to the judgment of the following query (SQ1005).

On the other hand, when the child query of the target query is except the view, it replaces the description of the child query name concerned in the generated SQL sentence, according to the method of calling determined by the call method determination step SQ205 which mentioned above and the type of the child query concerned (SQ1006).

Thus when suitable replacement of all of the child queries is completed, the SQL generation step SQ206 will be ended.

[Query Generation Step Sq207]

The query generation step SQ207 generates the query which can be used by SQL Sever using the SQL sentence generated in the SQL generation step SQ206 which was mentioned above. As shown in FIG. 12, the query generation step SQ207 judges whether the target query includes an action query (SQ1101).

When the action query is included, the stored-procedure (action query) of the original name is generated (SQ1102).

It judges whether the type is the view when an action query is not included (SQ1103), and when the type is the view, query of view type including the original query name is generated (SQ1104).

When the type is not the view, it judges whether the type is the function (SQ1105). Then when the type is the function, query of the function type including the original query name is generated.

On the other hand, when the type is not the function, it generates the stored-procedure including the original query name (SQ1107) and generates the in-line table function including the other function name (SQ1108).

In addition, the database conversion system of the present embodiment may comprise the query generation function for generating query of SQL Server by the input command for generating query. In this case, the above-mentioned query generation step may make the command for generating the query for SQL Server issue to the query generation function, and generate a query by the query by the query generation function.

Further when there is a query of the lower layer in which the parameter is included, it may generate query after declaring the parameter included in all the queries, The data conversion apparatus 1 shown in FIG. 3 mentioned above is realized by the hardware shown in FIG. 14, for example.

Figure 14:
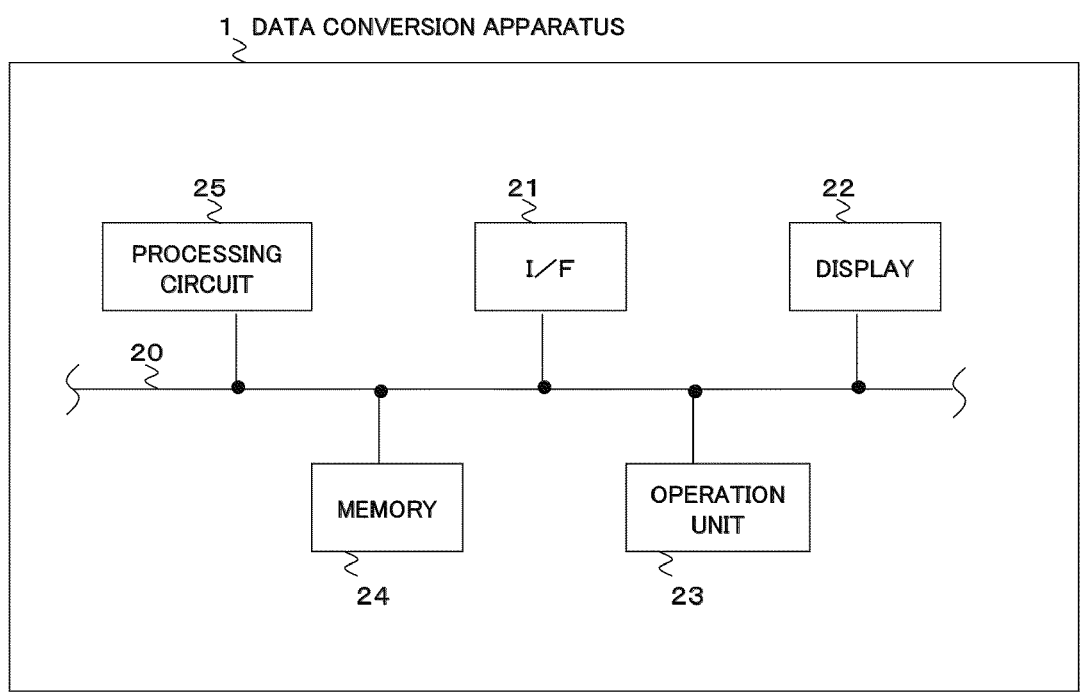
FIG. 14 is a hardware diagram of the data conversion apparatus shown in FIG. 3.

As shown in FIG. 14, the data conversion apparatus 1 has an interface 21, a display 22, operation unit 23, a memory 24, and a processing circuit 25, for example, and these are connected via bus 20.

The interface 21 is used, for example in order to communicate with other computers.

The display 22 displays various screens according to the signal from the processing circuit which executes the program PRG.

The operation unit 23 is operation means, such as a keyboard and a mouse.

The memory 24 memorizes the program PRG and the temporarily data used for processing of the program PRG. In addition, the program PRG may be memorized by an optical disc, a magnetic disk, the semiconductor memory device, etc. and may be read to a memory 24.

The processing circuit 25 performs the program PRG and controls processing of the data conversion apparatus 1. In each processing indicated by the flow chart of this embodiment, the processing circuit 25 writes the data in processing process in a memory 24 one by one, and reads it.

Processing of the data conversion apparatus 1 shown with this embodiment is described by the program PRG.

Hereafter the processing which converts the code of the database system of "ACCESS" into the code of the database system of "SQL SERVER" using the data conversion apparatus 1 with reference to each step of the flow chart mentioned above.

Figure 15:
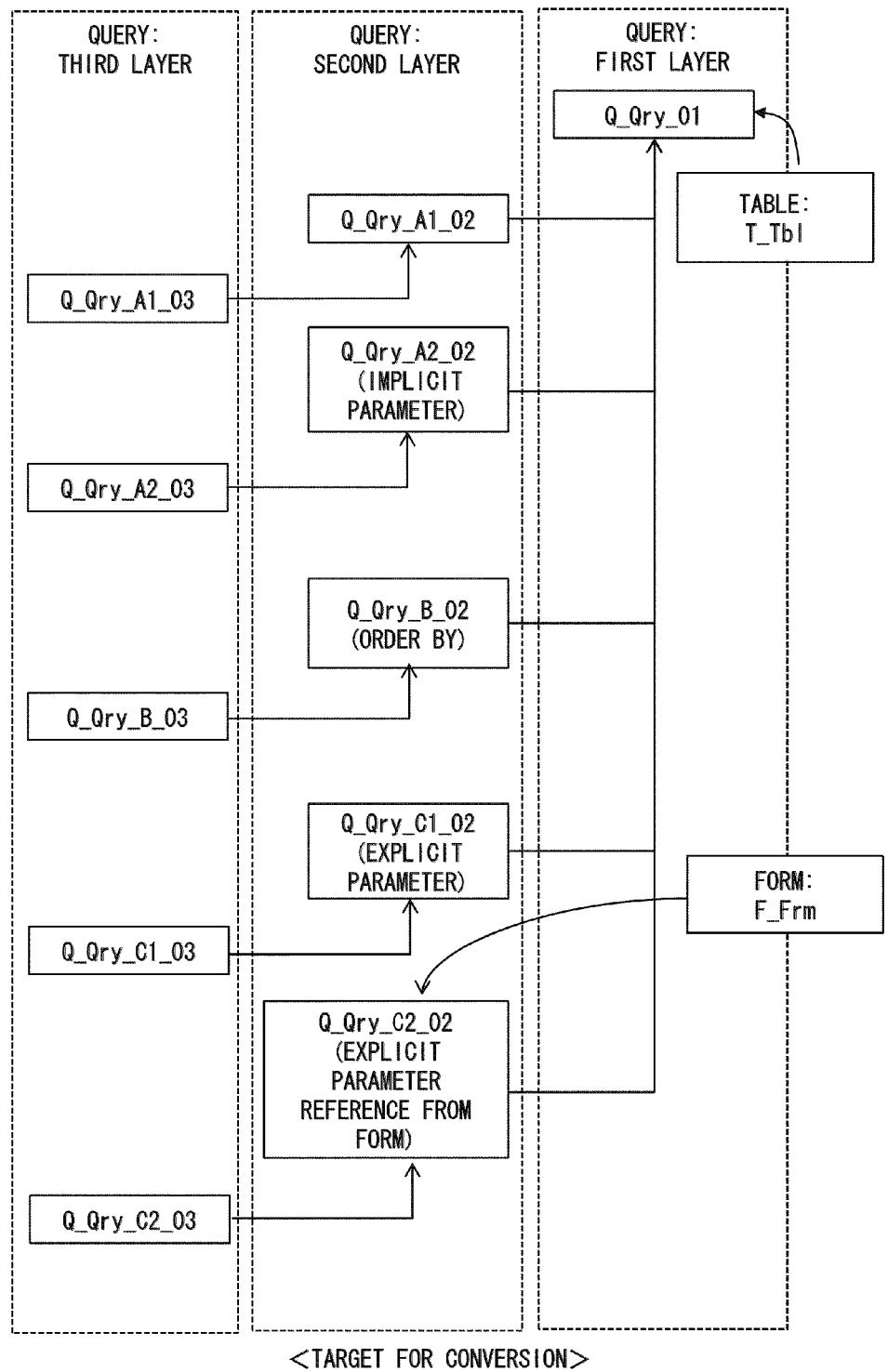
FIG. 15 is a conceptual figure of the code of the database system of "ACCESS" to be converted.
Figure 23:
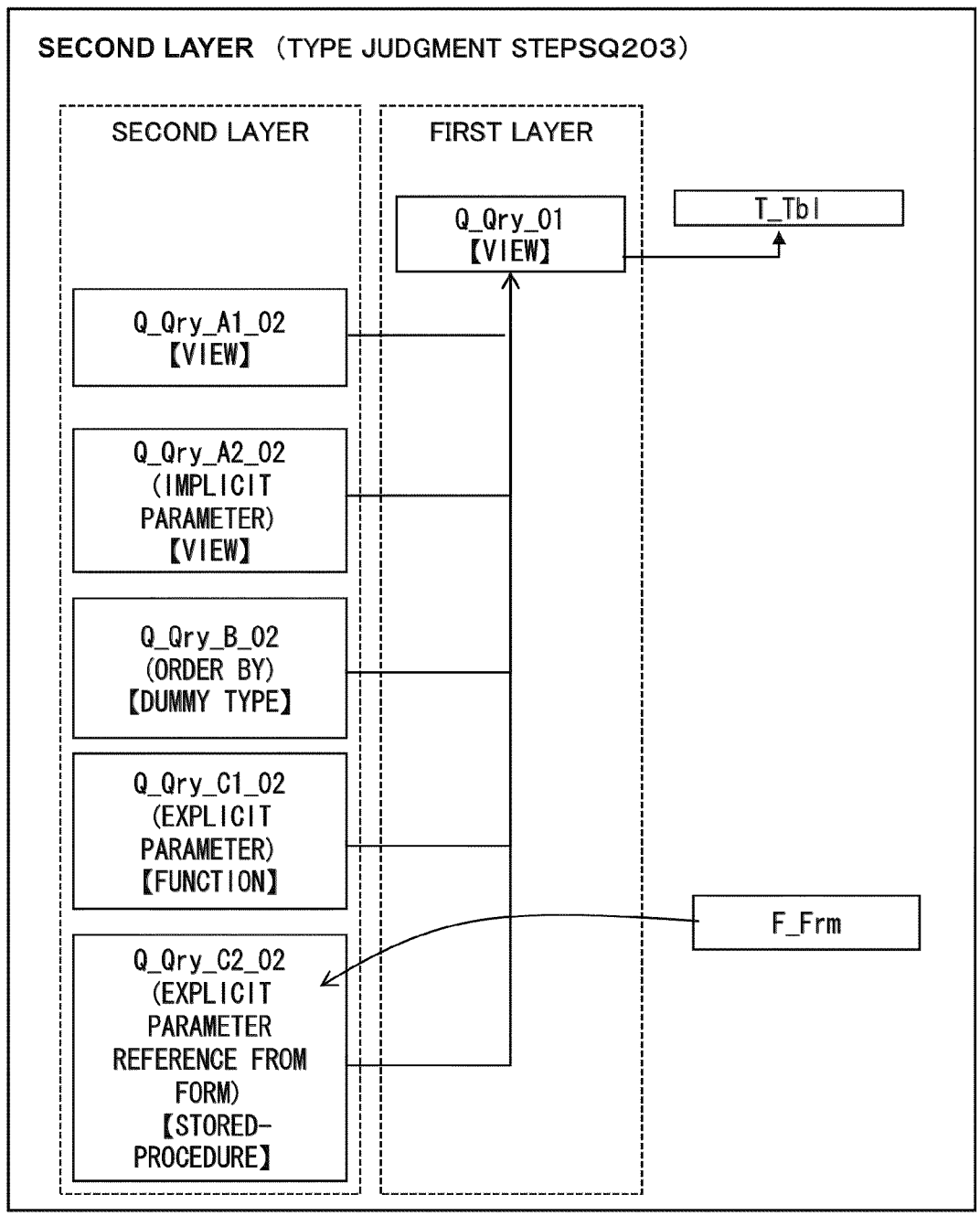
Figure 25:
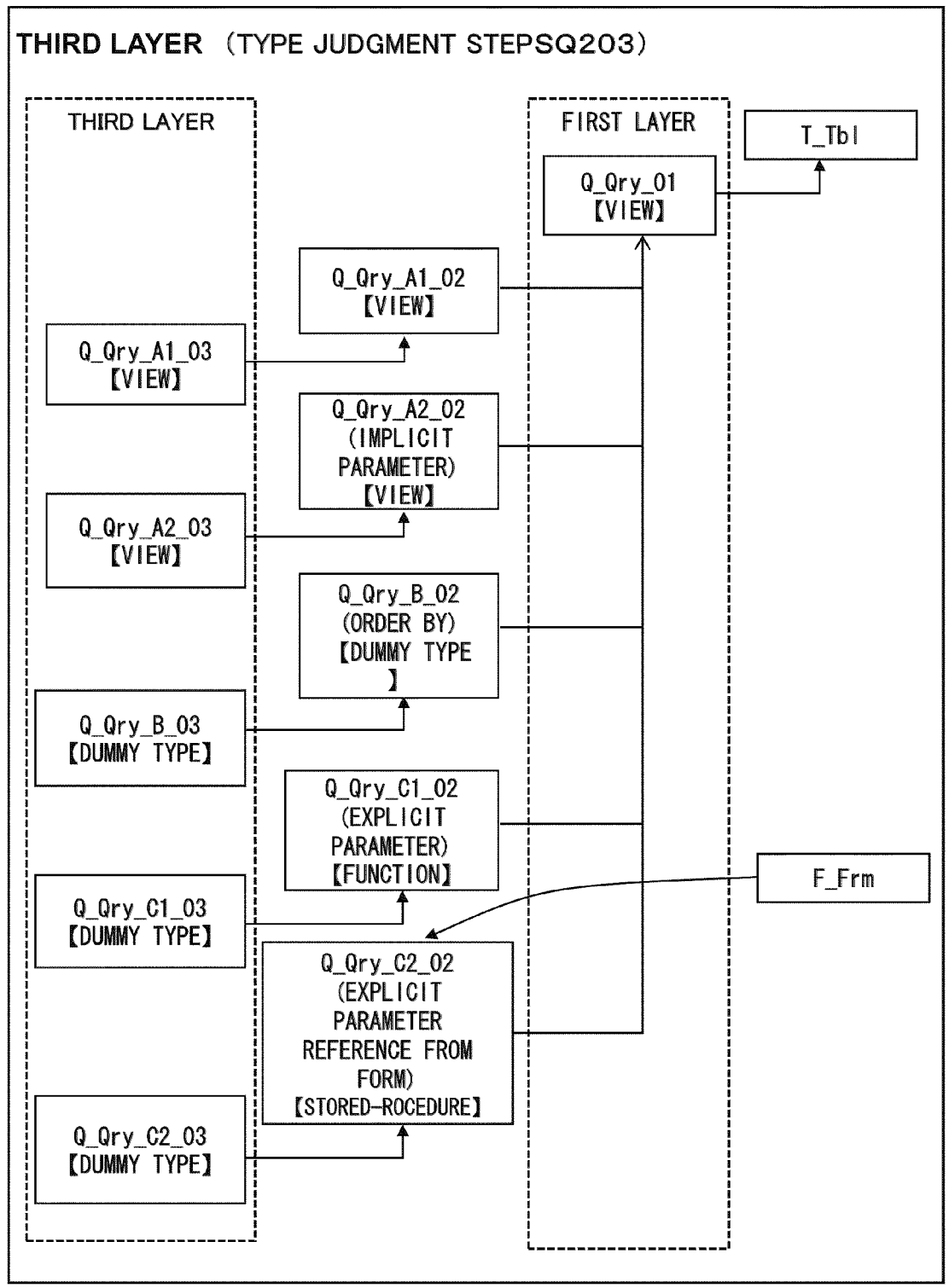

FIG. 15 is a conceptual figure of the code of the database system of "ACCESS" to be converted.

FIG. 16 to FIG. 20 are figures for explaining the details of each query shown in FIG. 15.

The double figures of the end of a query name indicates layers. FIG. 21 to FIG. 25 are figures for explaining the case where each processing of the type judgment step SQ203 shown in FIG. 6 is performed with respect to the code shown in FIG. 15.

Figure 26:
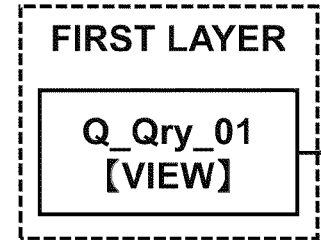
FIG. 26-to FIG. 30 are figures for explaining the case where the steps SQ501 to SQ504 of type correction step SQ204 shown in FIG. 7 to each code are processed after processing of FIG. 6.
Figure 28:
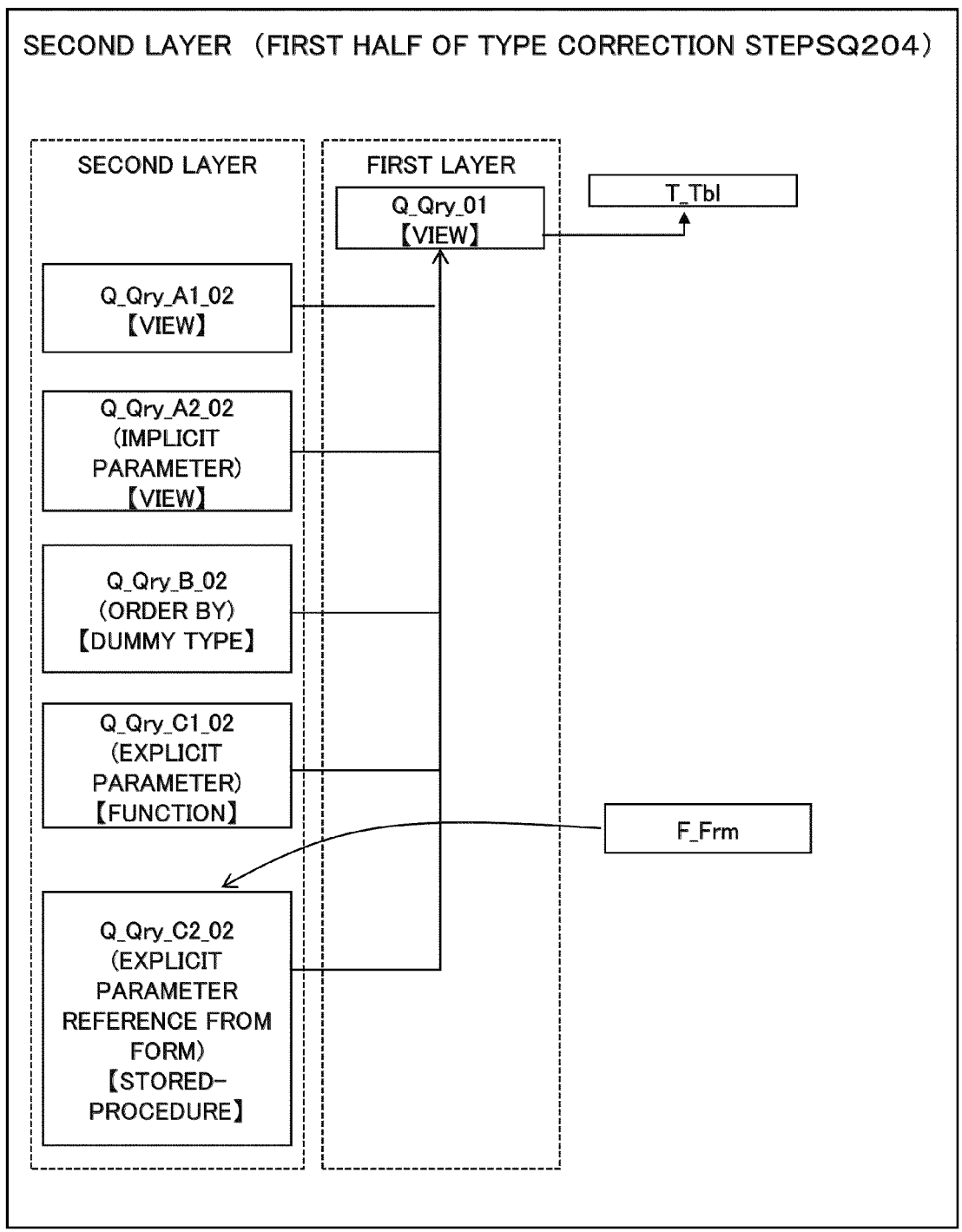
Figure 30:
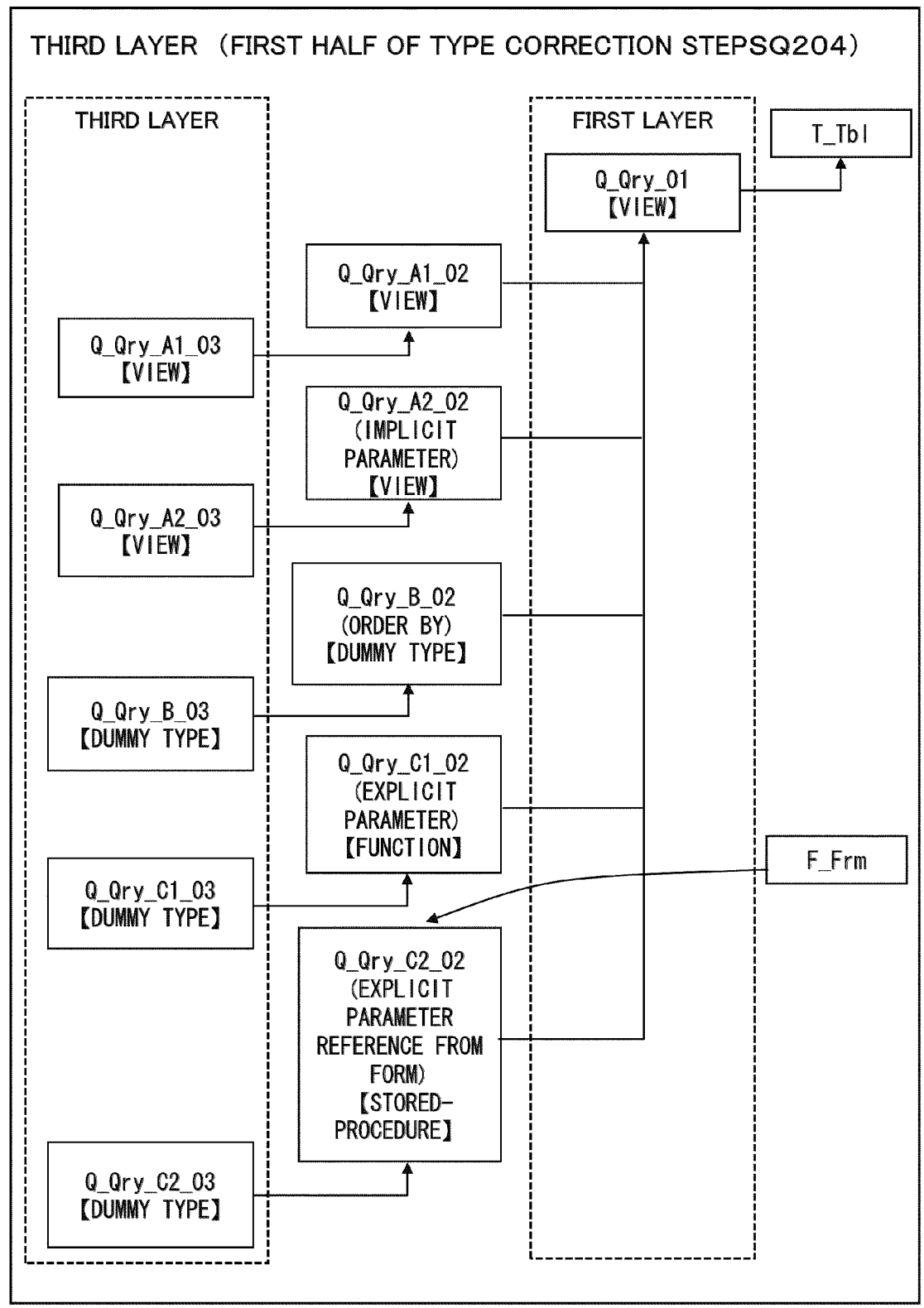
Figure 31:
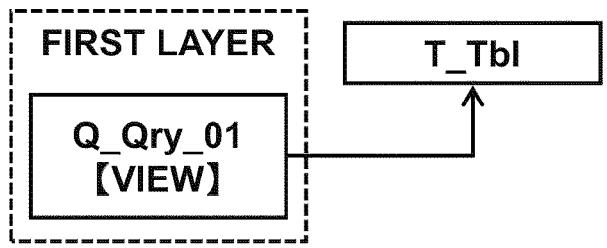
Figure 33:
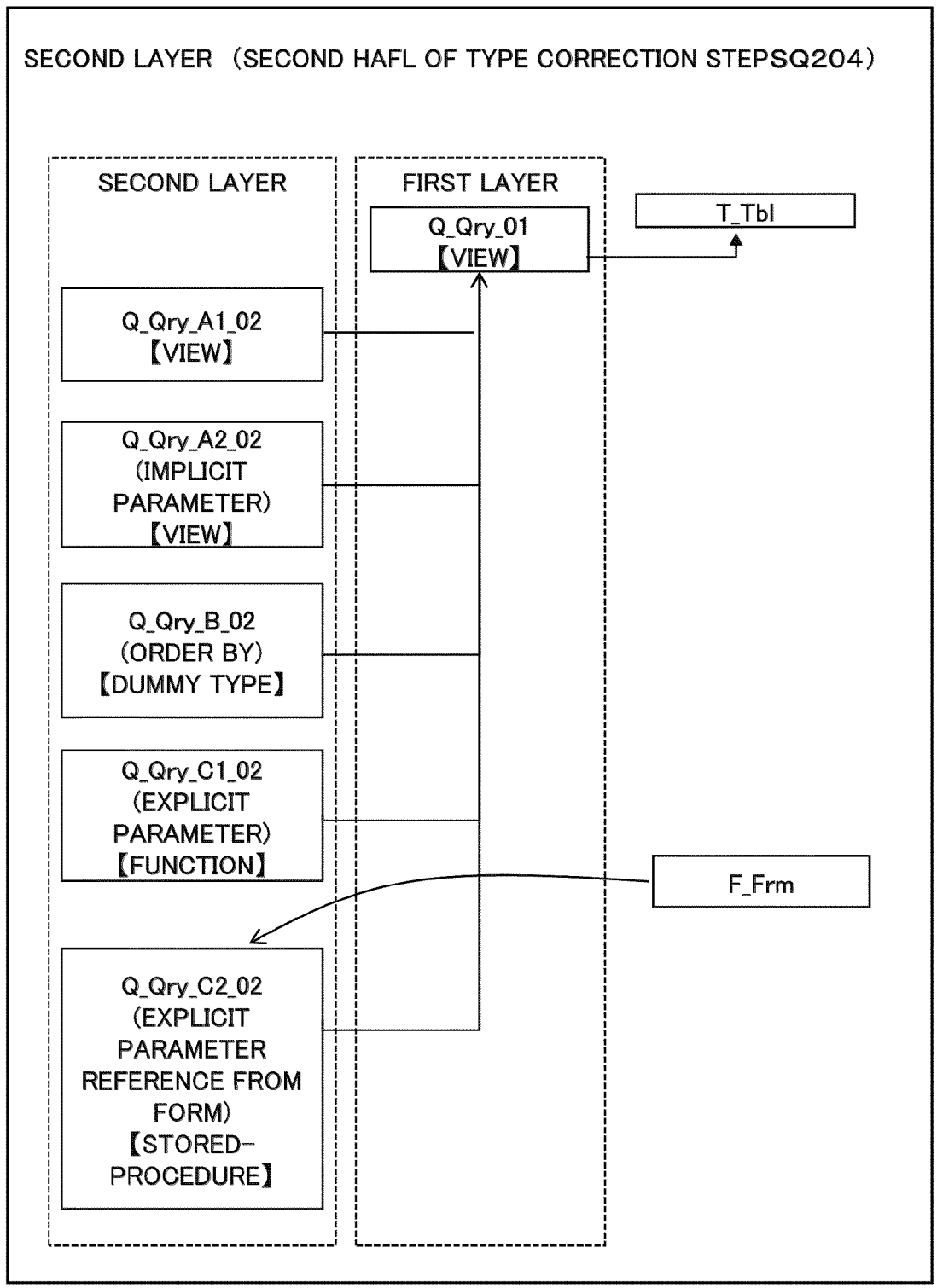
Figure 35:
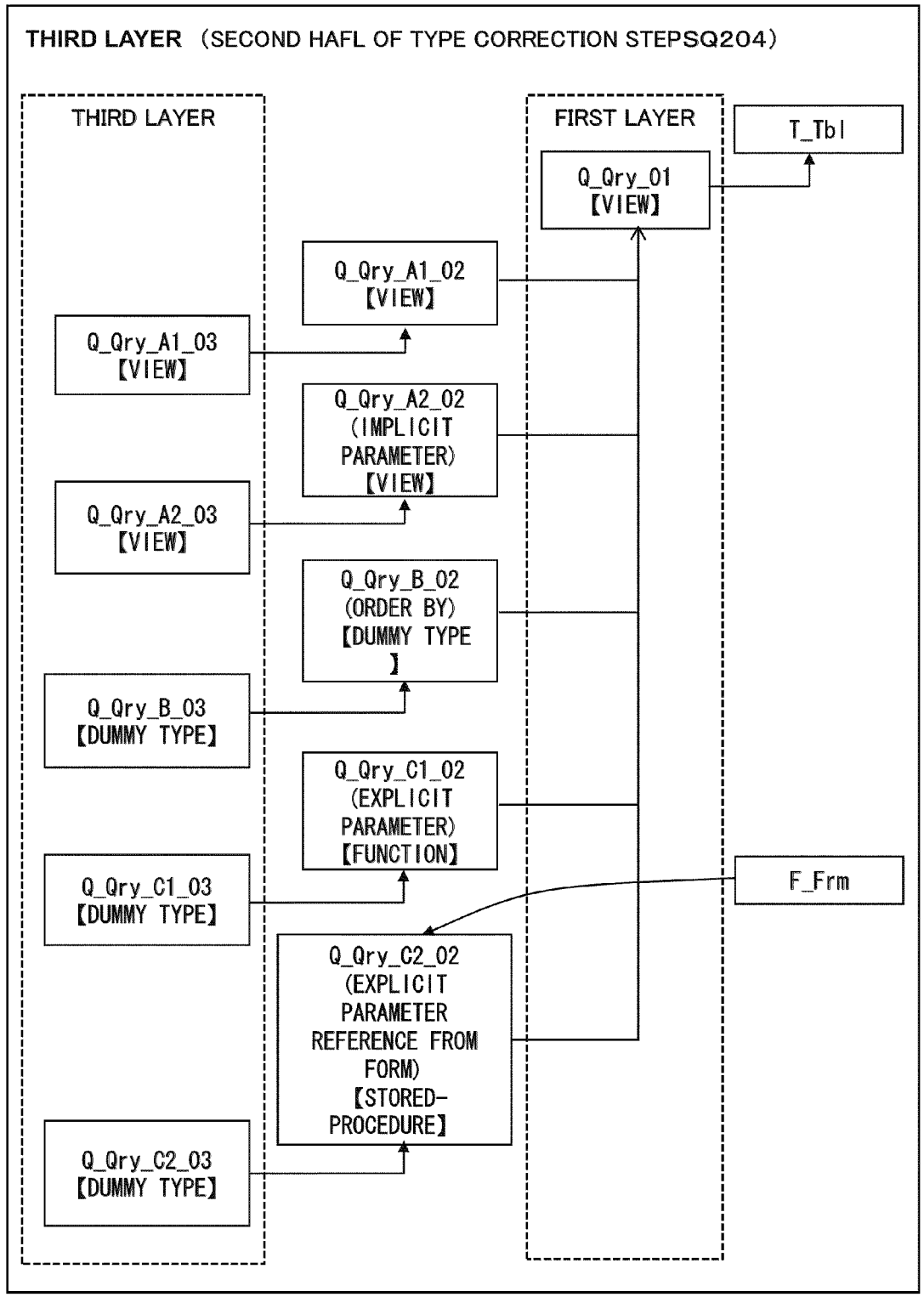
Figure 36:
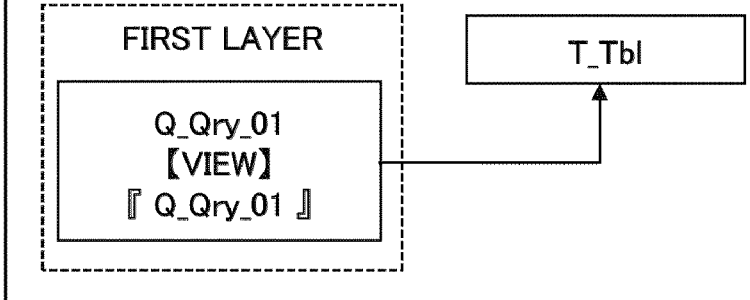
Figure 38:
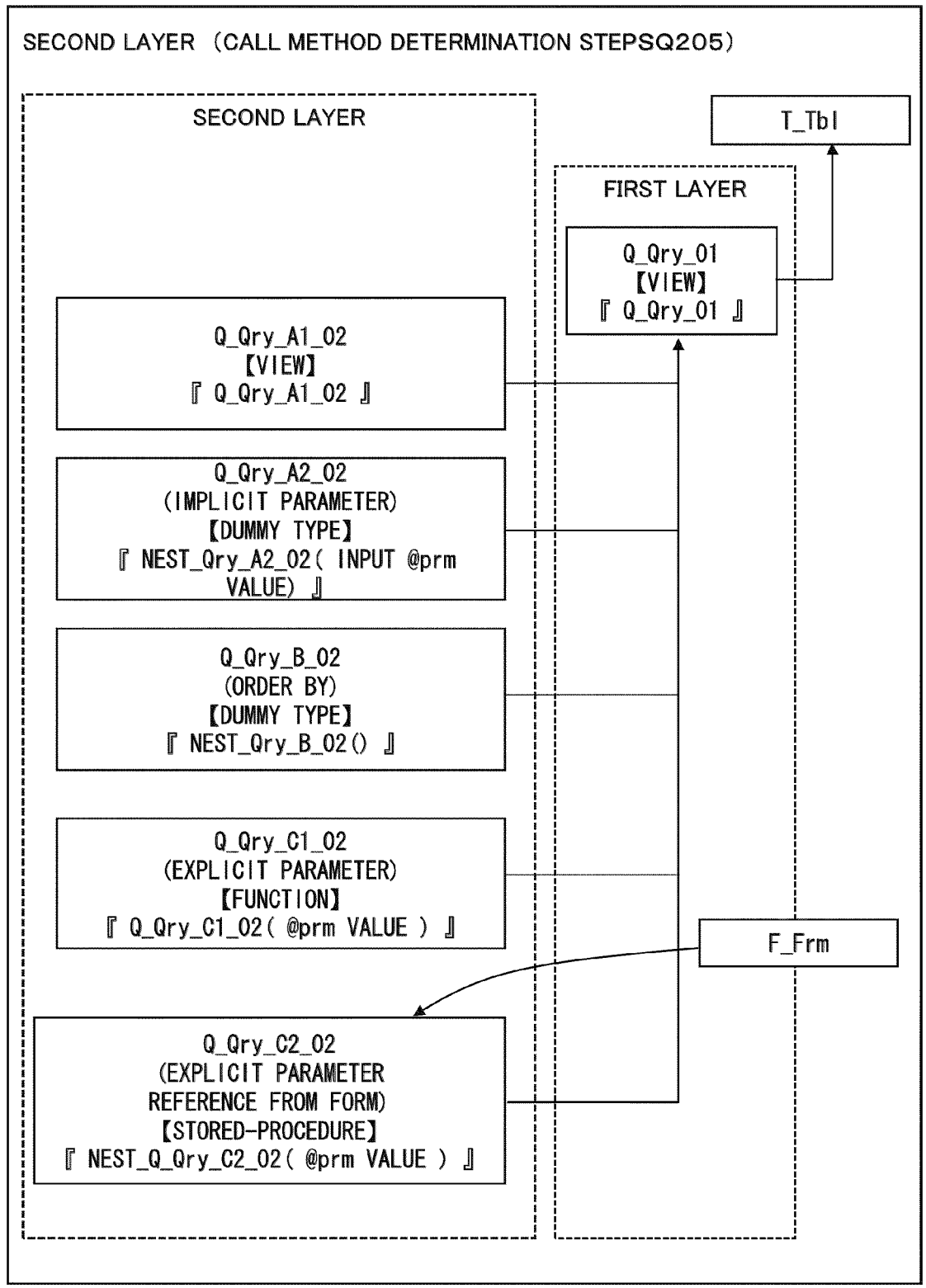

The FIG. 26-*to* FIG. 30 are figures for explaining the case where the steps SQ501 to SQ504 of type correction step SQ204 shown in FIG. 7 to each code are processed after processing of FIG. 6.

The FIG. 31 to FIG. 35 are figures for explaining the case where the steps SQ505 to SQ508 of type correction step SQ204 shown in FIG. 7 to each code is processed.

The FIG. 36 to FIG. 40 are figures for explaining the case where the call method determination step SQ205 which is shown in FIG. 11 to each code is processed.

The FIG. 40 to FIG. 41 are figures for explaining the case where the SQL generation step SQ206 shown in FIG. 12 to each code is processed.

The FIG. 5 to FIG. 61 are figures for explaining the case where the query generation step SQ207 shown in FIG. 13 to each code is processed.

FIG. 62 shows the codes of SQL SERVER after conversion generated by the data conversion apparatus 1 via processing of the FIG. 31 to FIG. 61 mentioned above.

As explained above, according to the present embodiment, while keeping the function of the database system after conversion, judgment processing of the query type at the time of conversion can be simplified, and processing cost can be held down as much as possible.

As mentioned above, about the query judged as the stored-procedure or the dummy type, irrespective of the existence of a parent query, the function type query after conversion other than the same stored-procedure type query after conversion of the function are generated in all cases. As a result problem is not occurred even when there is a parent.

Although a useless query increases by this, when extension of the application after conversion is assumed, manual generation of the function which needs big cost can be reduced sharply.

Large work mitigation can actually be achieved, at the spot of tool development by the system which uses the data conversion apparatus of the present embodiment. When performing synthetic application conversion (conversion of not only conversion of data but functionality) called upsizing, there may be a function never unrealizable only by conversion of the queries. Although a new query is generated by using the existing query, work cost can be greatly reduced when the function which can nest is already generated.

This invention is not limited in the embodiment mentioned above. Namely, regarding the component in the embodiment mentioned above, a person skilled in the art can do various changes, combination, sub-combination and substitution in the technical or equivalent scope of this invention.

For example, in the embodiment mentioned above, the example which the related database system to be converted is "Access" of Microsoft Corp., and the database system of after conversion is "SQL Server" of Microsoft Corp. is explained.

It may apply other database system having the function described in claims.

The invention claimed is:

1. A data conversion method for converting a first database system having a plurality of first queries into a second database having a plurality of second queries, wherein the first query permits all of parameter, processing of addition, deletion and updating with respect to a database, and becoming a child query of the other query, and the second query comprises:

a view type which prohibits the parameter, permits the processing of addition, deletion and update, and permits becoming a child query of the other query;

a function type which permits the parameter, prohibits the processing of addition, deletion and update, and permits becoming a child query of the other query; and a stored-procedure type which permits the parameter, permits the processing of addition, deletion and update, and prohibits becoming a child query of the other query, a processing circuit of the computer performs the processing of reading a plurality of the first queries of the first database from of a memory of the computer;

specifying a relation of parent and child of a plurality of the first queries based on a best structure of the read first query;

determining a type of the second query corresponding to the first query in order from the first query of a bottom layer to the first query of a top layer in the direction from a child query to a parent query base on the relation of parent and child; and generating the second query corresponding to the first query based on the determined type in order from the first query of a bottom layer to the first query of a top layer in the direction from a child query to a parent query based on the relation of parent and child, the determining the type of the second query is performed by the circuit and comprises determining the type by using a dummy type which is used only in the process of conversion and other than the function type and the stored-procedure type, determining the second query corresponding to the first query as the dummy type when the first query is determined as the function type, the stored-procedure type of the dummy type based on the parent child relation of the nest structure, and determining the type by determining the second query to the first query as the view type when the first query concerned is not action query, does not include parameter, and the child query thereof is not existed or is the view type, the generating the second query is performed by the circuit and comprises generating the second query of the stored-procedure type including function description equivalent to the functional description of a target query and generating the second query of the function type including function description equivalent to the functional description of the target query with respect to the target query which is the first query judged in the determining type as the dummy type or the stored-procedure type.

2. A data conversion method converting as set forth in claim 1, wherein the generating of the second query is performed by the circuit and generates the queries as that both of the second query of the stored-procedure type and the second query of the function type which were generated by the generating query call the child query of the target query, the second query of the stored-procedure type includes description of the addition, the deletion and the update process to the second query corresponding to the child query of the target query, and the second query of the function type is described as the child query in the second query corresponding to a parent query of the target query.

3. A data conversion method converting as set forth in claim 2, wherein the determining a type of the second query is performed by the circuit and comprises:

determining the second query corresponding to the first query as the stored-procedure type when the first query concerned is an action query;

determining the second query corresponding to the first query as the function type when the first query concerned is not an action query, including parameter, is not referred from a form, and the child query thereof is not existed or is the view type; and determining the second query corresponding to the first query as the stored-procedure type when the first query concerned is not action query, includes parameter, is referred from a form, and the child query thereof is not existed or is the view type.

4. A data conversion method converting as set forth in claim 3, wherein the function certainly returns a table as a return value, the stored-procedure is function in which existence of the return value and type are not defined.

5. A data conversion method according to claim 3, further comprising:

determining the description relating to method of calling when each of the first query is called as a child query based on the second query corresponding to the first query concerned in order from the first query of bottom layer to the first query of top later;

generating the functional description which can be used in the second query based on the functional description included in the first query in order from the first query of a bottom layer to the first query of a top layer; and replacing the description for calling the child query into the description of the method of calling determined in the determining the description relating to method of calling when the description for calling the child query is included in the description of the first query, wherein the generating of the second query is performed by the circuit and comprises generating the second query by using the function description generated by the generating the functional description.

6. A data conversion method according to claim 4, further comprising:

determining the description relating to method of calling when each of the first query is called as a child query based on the second query corresponding to the first query concerned in order from the first query of bottom layer to the first query of top later;

generating the functional description which can be used in the second query based on the functional description included in the first query in order from the first query of a bottom layer to the first query of a top layer; and replacing the description for calling the child query into the description of the method of calling determined in the determining the description relating to method of calling when the description for calling the child query is included in the description of the first query, wherein the generating of the second query is performed by the circuit and comprises generating the second query by using the function description generated by the generating the functional description.

7. A data method converting as set forth in claim 3, further comprising, correcting the type of the first query having a child query which has a parameter among the first query judged in the determining type that it is the dummy type.

8. A data method converting as set forth in claim 4, further comprising, correcting the type of the first query having a child query which has a parameter among the first query judged in the determining type that it is the dummy type.

9. A data conversion method converting as set forth in claim 3, wherein query generation function which generates the second query according to the contents of the inputted query generation command is available in the second database system, and the query generation command which indicates the second query to be generated is issued by the processing circuit in the generating the second query.

10. A data conversion method converting as set forth in claim 3, wherein the parameter included in lower layer is described as a parameter of the first query which is a target of the processing by the processing circuit, at the time of issuing the query generation command for generating the second query corresponding to each of the first query, even in the case the query of which layer is lower than the first query of the target for processing exists, and the parameter is included in the query of the lower layer.

11. A data conversion apparatus for converting a first database system having a plurality of first queries into a second database having a plurality of second queries, wherein the first query permits all of parameter, processing of addition, deletion and updating with respect to a database, and becoming a child query of the other query, and the second query comprises:

a view type which prohibits the parameter, permits the processing of addition, deletion and update, and permits becoming a child query of the other query;

a function type which permits the parameter, prohibits the processing of addition, deletion and update, and permits becoming a child query of the other query; and a stored-procedure type which permits the parameter, permits the processing of addition, deletion and update, and prohibits becoming a child query of the other query, the data conversion apparatus comprising:

a reader reading a plurality of the first queries of the first database from of a memory of the computer;

a specifyer specifying a relation of parent and child of a plurality of the first queries based on a nest structure of the read first query;

a type determiner determining a type of the second query corresponding to the first query in order from the first query of a bottom layer to the first query of a top layer in the direction from a child query to a parent query base on the relation of parent and child; and a query generator generating the second query corresponding to the first query based on the determined type in order from the first query of a bottom layer to the first query of a top layer in the direction from a child query to a parent query base on the relation of parent and child, wherein the type determiner determines the type by using a dummy type which is used only in the process of conversion and other than the function type and the stored-procedure type, determines the second query corresponding to the first query as the dummy type when the first query is determined as the function type, the stored-procedure type of the dummy type based on the parent child relation of the nest structure, and determines the type by determining the second query to the first query as the view type when the first query concerned is not action query, does not include parameter, and the child query thereof is not existed or is the view type, and the query generator generates the second query of the stored-procedure type including function description equivalent to the functional description of a target query and generates the second query of the function type including function description equivalent to the functional description of the target query with respect to the target query which is the first query judged in the determining type as the dummy type or the stored-procedure type.

12. A computer program tangibly embodied on a non-transitory computer readable storage medium which, when executed causes a computer to perform operations for converting a first database system having a plurality of first queries into a second database having a plurality of second queries, wherein the first query permits all of parameter, processing of addition, deletion and updating with respect to a database, and becoming a child query of the other query, and the second query comprises:
- a view type which prohibits the parameter, permits the processing of addition, deletion and update, and permits becoming a child query of the other query;
- a function type which permits the parameter, prohibits the processing of addition, deletion and update, and permits becoming a child query of the other query; and
- a stored-procedure type which permits the parameter, permits the processing of addition, deletion and update, and prohibits becoming a child query of the other query;

the program comprises a description of processing to be executed by the computer, the processing comprises:
- reading a plurality of the first queries of the first database from of a memory of the computer;
- specifying a relation of parent and child of a plurality of the first queries based on a nest structure of the read first query;
- determining a type of the second query corresponding to the first query in order from the first query of a bottom layer to the first query of a top layer in the direction from a child query to a parent query base on the relation of parent and child; and
- generating the second query corresponding to the first query based on the determined type in order from the first query of a bottom layer to the first query of a top layer in the direction from a child query to a parent query base on the relation of parent and child, wherein the determining the type of the second query is performed by the circuit and comprises determining the type by using a dummy type which is used only in the process of conversion and other than the function type and the stored-procedure type, determining the second query corresponding to the first query as the dummy type when the first query is determined as the function type, the stored-procedure type or the dummy type based on the parent child relation of the nest structure, and determining the type by determining the second query to the first query as the view type when the first query concerned is not action query, does not include parameter, and the child query thereof is not existed or is the view type, and the generating the second query is performs by the circuit and comprises generating the second query of the stored-procedure type including function description equivalent to the functional description of a target query and generating the second query of the function type including function description equivalent to the functional description of the target query with respect to the target query which is the first query judged in the determining type as the dummy type or the stored-procedure type.

* * * * *